(12) United States Patent
Carlson et al.

(10) Patent No.: US 10,217,461 B1
(45) Date of Patent: Feb. 26, 2019

(54) NOISE CANCELLATION FOR OPEN MICROPHONE MODE

(71) Applicant: Amazon Technologies, Inc., Seattle, WA (US)

(72) Inventors: Ty Loren Carlson, Redmond, WA (US); Rohan Mutagi, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/498,086

(22) Filed: Apr. 26, 2017

Related U.S. Application Data

(63) Continuation of application No. 14/752,515, filed on Jun. 26, 2015, now Pat. No. 9,646,628.

(51) Int. Cl.
| | |
|---|---|
| *A61F 11/06* | (2006.01) |
| *H03B 29/00* | (2006.01) |
| *G10K 11/16* | (2006.01) |
| *G10L 15/20* | (2006.01) |
| *G10L 25/84* | (2013.01) |
| *G10L 21/0272* | (2013.01) |
| *G10L 21/0208* | (2013.01) |
| *G10L 15/22* | (2006.01) |
| *G10L 25/78* | (2013.01) |

(52) U.S. Cl.
CPC .............. *G10L 15/20* (2013.01); *G10L 15/22* (2013.01); *G10L 21/0208* (2013.01); *G10L 21/0272* (2013.01); *G10L 25/84* (2013.01); *G10L 2015/223* (2013.01); *G10L 2021/02087* (2013.01); *G10L 2025/783* (2013.01)

(58) Field of Classification Search
CPC ...... G10L 15/20; G10L 15/22; G10L 21/0208
See application file for complete search history.

(56) References Cited

U.S. PATENT DOCUMENTS

| | | | |
|---|---|---|---|
| 5,553,190 A | 9/1996 | Ohya et al. | |
| 5,870,397 A * | 2/1999 | Chauffour | ............. G10L 19/012 370/435 |
| 5,950,164 A * | 9/1999 | Takahashi | ............... G10L 21/04 704/229 |

(Continued)

*Primary Examiner* — Simon King
(74) *Attorney, Agent, or Firm* — Lee & Hayes, P.C.

(57) ABSTRACT

A system has multiple audio-enabled devices that communicate with one another over an open microphone mode of communication. When a user says a trigger word, the nearest device validates the trigger word and opens a communication channel with another device. As the user talks, the device receives the speech and generates an audio signal representation that includes the user speech and may additionally include other background or interfering sound from the environment. The device transmits the audio signal to the other device as part of a conversation, while continually analyzing the audio signal to detect when the user stops talking. This analysis may include watching for a lack of speech in the audio signal for a period of time, or an abrupt change in context of the speech (indicating the speech is from another source), or canceling noise or other interfering sound to isolate whether the user is still speaking. Once the device confirms that the user has stopped talking, the device transitions from a transmission mode to a reception mode to await a reply in the conversation.

20 Claims, 12 Drawing Sheets

(56) References Cited

U.S. PATENT DOCUMENTS

| | | | |
|---|---|---|---|
| 6,807,193 B1* | 10/2004 | Beser | H04L 12/2801 |
| | | | 370/280 |
| 7,230,955 B1* | 6/2007 | James | G10L 19/012 |
| | | | 370/466 |
| 7,532,581 B1* | 5/2009 | Metzger | H04M 3/2236 |
| | | | 370/252 |
| 9,826,529 B1* | 11/2017 | Jorgovanovic | H04L 5/1461 |
| 2009/0251545 A1* | 10/2009 | Shekarri | G06Q 10/00 |
| | | | 348/158 |
| 2012/0072211 A1 | 3/2012 | Edgington et al. | |
| 2013/0060571 A1* | 3/2013 | Soemo | G10L 15/30 |
| | | | 704/251 |
| 2014/0162555 A1 | 6/2014 | Wernaers | |
| 2014/0178027 A1* | 6/2014 | Lee | H04N 21/41407 |
| | | | 386/201 |
| 2014/0324421 A1* | 10/2014 | Kim | G10L 15/20 |
| | | | 704/233 |
| 2016/0027447 A1 | 1/2016 | Dickins et al. | |
| 2016/0125883 A1 | 5/2016 | Koya | |

\* cited by examiner

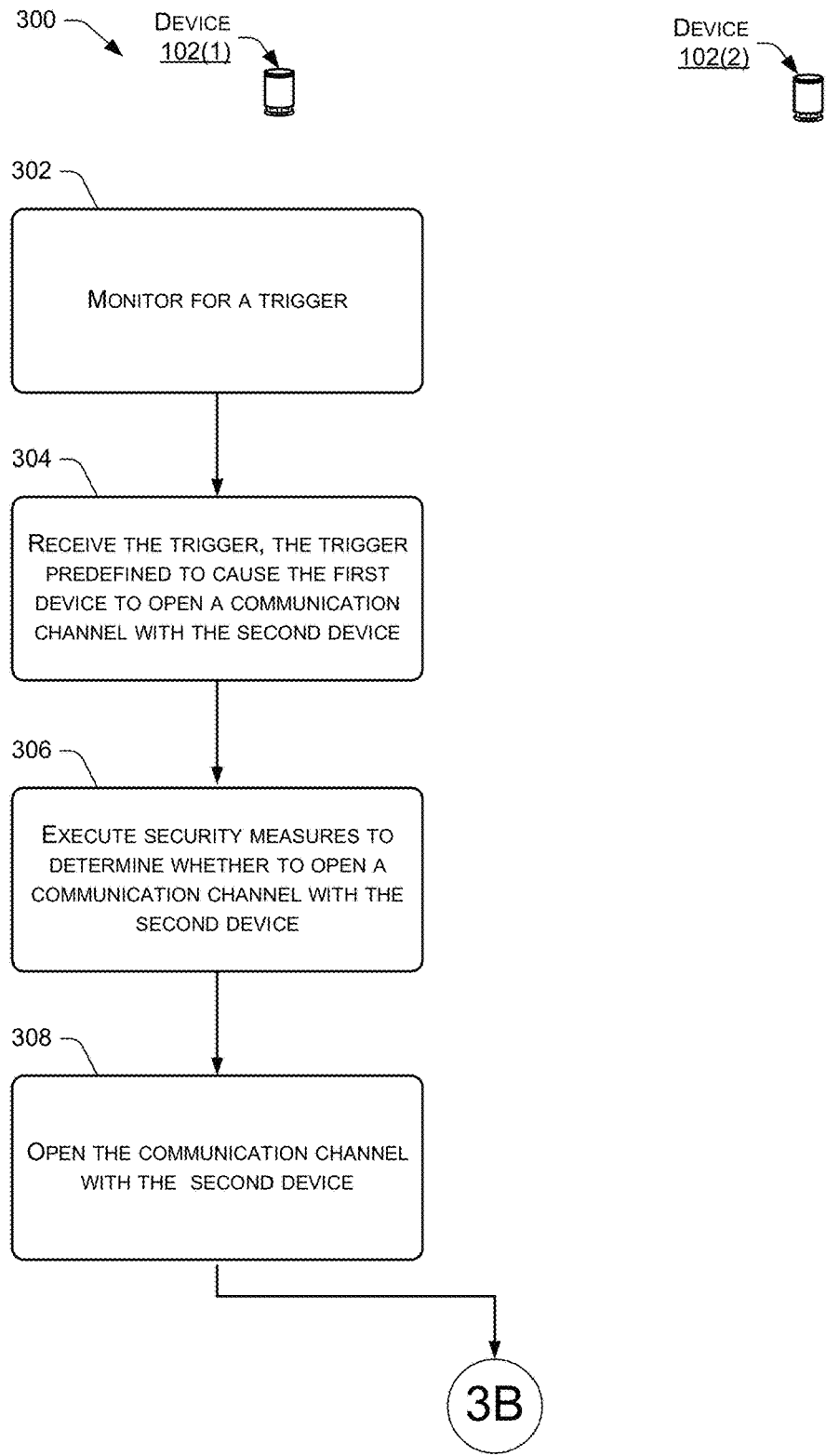

NOISE CANCELLATION FOR OPEN MICROPHONE MODE

RELATED APPLICATIONS

This application claims priority to and is a continuation of U.S. patent application Ser. No. 14/752,515, filed on Jun. 26, 2015, the entire contents of which are incorporated herein by reference.

BACKGROUND

Many types of electronic devices can interact with users via speech. Users of these electronic devices speak commands, which the electronic devices utilize to perform various functions. For instance, a user may command an electronic device to activate, deactivate, communicate with another electronic device, or perform other features. However, it is not uncommon for an environment to contain sources of interfering sound that make it difficult to isolate the user's speech and thus, to recognize and understand the user's speech. For instance, a typical environment may contain one or more media sources, appliances, or other people that generate interfering sound, and often even spoken sound.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 3A-3D present a flow diagram of an illustrative process for utilizing noise cancellation during an open microphone mode of communication between devices.

DETAILED DESCRIPTION

Figure 1A:
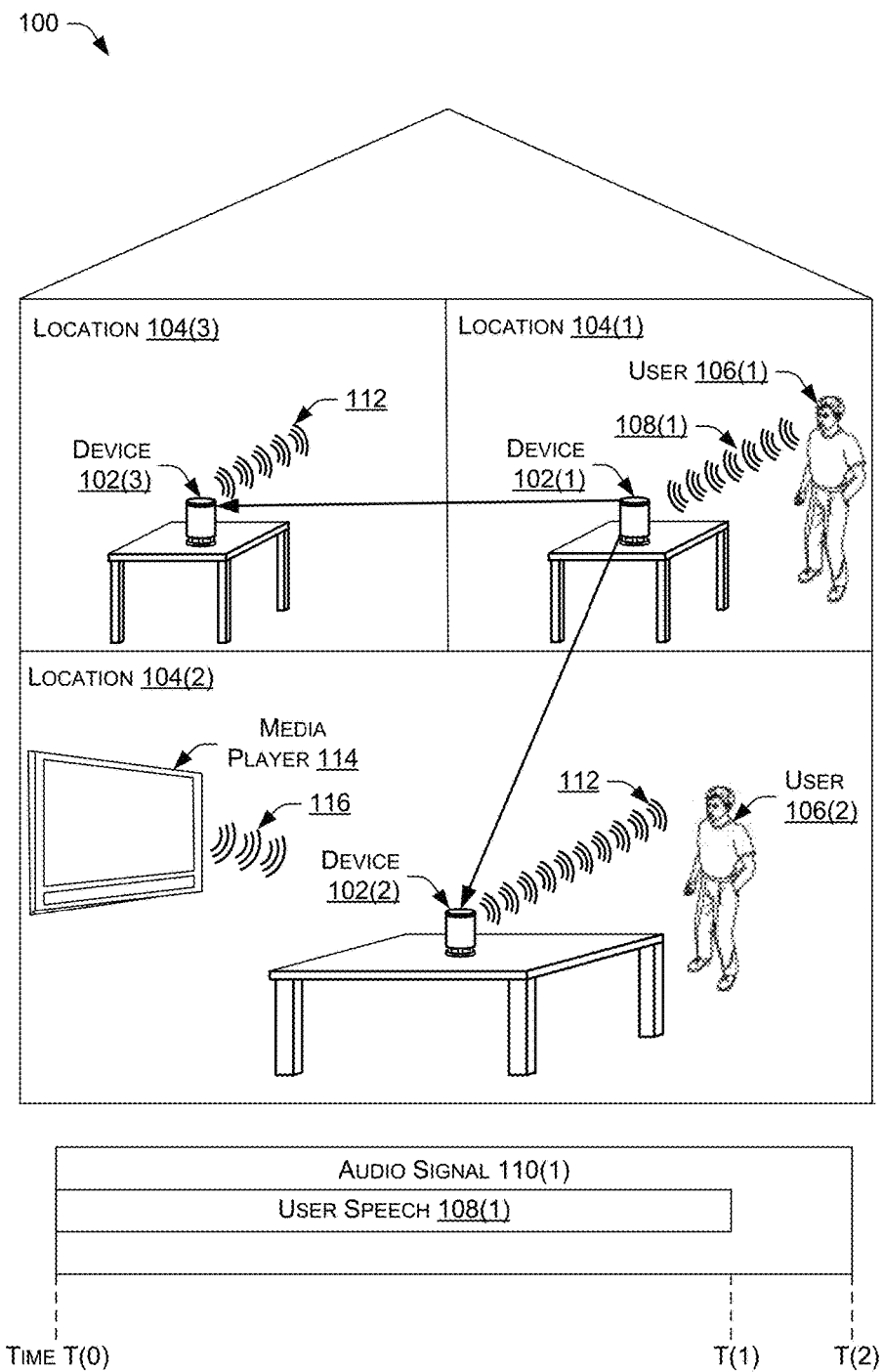
FIGS. 1A-1C illustrate various examples of an environment in which users employ electronic devices to communicate. The devices are configured to support an open microphone mode of communication and may be further configured to utilize noise cancellation during this communication.

This disclosure describes a system of audio-enabled devices communicate with one another over an open microphone mode of communication. When a user speaks a trigger word, the nearest device validates the trigger word and opens a communication channel with another device. As the user talks, the device receives the speech and generates an audio signal representation that includes the speech and may additionally include other background or interfering sound from the environment. The device transmits the audio signal to the other device to form a conversation, while continually analyzing the audio signal to detect when the user stops talking. This analysis may include watching for a lack of speech in the audio signal for a period of time, or an abrupt change in context of the speech (indicating the speech is from another source), or canceling noise or other interfering sound to isolate whether the user is still speaking. Once the device confirms that the user has stopped talking, the device transitions from a transmission mode to a reception mode to await a reply in the conversation.

More particularly, in an open microphone mode, two users communicate with one another using respective electronic communication devices that are equipped with microphones to capture user speech input as well as any other sound in the environment. For instance, a first user may utilize an originating or first device to communicate with a second user, who is employing a destination or second device. The first and second users can be located near one another (e.g., in the same building) or geographically remote from one another. The first user may direct the first device to initiate or open a communication channel with the second device, and in some cases, by speaking to the first device.

When opening the communication channel with user speech, a microphone of the first device receives the user speech and produces an audio signal based on the user speech. The first device can then analyze the audio signal to determine whether the audio signal includes a trigger to open the communication channel. In some examples, the trigger can include one or more triggering words included in the user speech, such as "activate," "call John" (e.g., the second user), or "communicate with the second device". In other examples, the trigger can correspond with a context associated with the user speech. For instance, the trigger can include the first user saying, "John are you hungry" or "John are you ready for school." The first device can then determine the context associated the user speech using the audio signal and open the communication channel with the second device based on the context.

In some examples, the first device determines whether or not triggers included in audio signals are valid before opening a communication channel. For instance, the first device can receive audio signals that include interfering sounds. Interfering sounds can include background sounds produced by a media device (e.g., television, radio, etc.), background sounds produced by an appliance (e.g., refrigerator, dishwasher, etc.), background sounds (user speech) produced from other people, background sounds produced from animals, and/or any other sorts of sounds (e.g., running water, sounds produced by weather, etc.) emanating in the environment that can be captured by the microphone of the first device. In some examples, the interfering sounds can include a trigger (e.g., triggering word emitted by a television or radio) that the first device would normally interpret as the user's command to open the communication channel with the second device.

In some examples, the first device can take a sample (digital fingerprint) of a portion of the audio signal and use the digital fingerprint to determine whether the trigger included in the audio signal is valid. As part of this process, the first device can compare the digital fingerprint to a database of reference content items to identify whether one or more content items are included in the audio signal. The content items may be known forms of content delivered into the environment by content sources, such as television or radio or streamed programs, or the content items may be known forms of sound produced in an environment, such as appliances, running water, weather, animals, or the like. In this case, the content items found in the audio signal are one example of an interfering sound to the user speech in an open microphone mode of operation. In some examples, the first device can obtain and/or access the database from one or more content services, repositories, servers, and/or or sources over a network. In other examples, the first device may store the database locally in a computer-readable media (illustrated in FIG. 2). The first device can then determine whether the trigger was produced by a content item (interfering sound) included in the audio signal. If the first device determines that the content item produced the trigger, the first device may determine that the trigger included in the audio signal is not valid and thus, the first device may not open the communication channel with the second device.

Besides receiving triggers that are not valid from content items, the first device can further receive triggers that are not valid from user speech. For instance, the first user may be talking to another person next to the first device. During their conversation, the first device may receive audio signals corresponding to the conversation, where one of audio signals includes a trigger (e.g., triggering word). In response, the first device can determine whether the trigger is valid. In some examples, the first device can determine whether the trigger is valid based on a context in which the trigger was used in the user speech that includes the trigger. For instance, if the trigger is in the middle of a sentence, such as "Your kid is active today" where "active" is the trigger, the first device can determine that the trigger is not valid.

After receiving and determining that a trigger included in an audio signal is valid, the first device opens the communication channel with the second device in order to send communications (audio signals) to the second device. In some examples, the first device and the second device communicate through the communication channel using a half-duplex communication system. For instance, in order to open the communication channel with the second device, the first device switches to a transmission mode while the second device is in a receiving mode. In a transmission mode, the first device can send communications (i.e., audio signals) to the second device through the communication channel. In a receiving mode, the second device can receive the communications from the first device through the communication channel.

In some examples, in order to switch to a transmission mode, the first device turns on or activates a transmitter of the first device. The first device may further turn off or deactivate a receiver of the first device. Meanwhile, the second device is placed in receiving mode where the transmitter is turned off or deactivated while the receiver is turned on or activated. As such, the first device can use its transmitter to send communications to the second device and the second device can use its receiver to listen for and receive the communications.

As the first device sends a communication to the second device through the communication channel, the first device can determine that the first user is finished with his or her communication (message) to the second user. In some examples, the first device makes this determination by analyzing an audio signal that the first device is receiving to determine when the audio signal lacks (i.e., does not include) user speech from the first user. In response, the first device can switch from the transmission mode to the receiving mode. In some examples, switching to the receiving mode can include the first device turning off (deactivating) the transmitter and/or turning on (activating) the receiver of the first device if the receiver is not already turned on. The first device may further close (deactivate) the microphone of the first device so the first device stops receiving audio signals.

The second device can then determine that the first device is done sending communications and switch from the receiving mode to a transmission mode. In some examples, switching to the transmission mode can include the second device turning on or activating the transmitter of the second device and turning off or deactivating the receiver of the second device. Additionally, the second device can open or activate a microphone of the second device if the microphone of the second device is not already open. In some examples, the second device can determine that the first device is finished sending communications to the second device when the second device stops receiving the communications from the first device.

In some examples, the first and second devices can continue to communicate through the communication channel using this "back and forth" type of communication until the first user and the second user stop communicating with one another altogether. For instance, the first and second devices can continue to switch between transmission and reception modes during the conversion between the users until that conversation ends. The first device (and/or second device) can then determine that the conversation between the first and second users is finished and close the communication channel between the first device and the second device in response. For instance, the first device and the second device can close the communication channel by each switching to a receiving mode.

In certain situations, during the conversation between the first user and the second user, either or both of the first and second devices can receive audio signals that include interfering sounds. As discussed above, interfering sounds can include background sounds produced by media device (e.g., television, radio, etc.), background sounds produced by an appliance (e.g., refrigerator, dishwasher, etc.), background sounds (user speech) produced from other people, background sounds produced from animals, and/or any other sort of sound that can be captured by a microphone of a device. This interfering sound can create problems for the first device and the second device when the first device and the second device are communicating using half-duplex communications. For instance, the interfering sound can cause the first device (and/or the second device) to stay in a transmission mode even though the first user is done talking and the first device should be done receiving speech from the first user. Keeping the first device in the transmission mode can cause the transmitter of the first device to continue sending a communication to the second device and thus, the second device is not able to send communications to the first device.

To account for interfering sounds, the first and second devices can be equipped with noise cancellation components to reduce or effectively eliminate unwanted interfering sounds as the users conduct a conversation through the communication channel. The noise cancellation components help the devices distinguish between the interfering sounds and the users' speech. For instance, when the first device is analyzing an audio signal to determine when the audio signal lacks user speech from the first user, the first device uses the noise cancellation components to process the audio signal to identify any interfering sound included in the audio signal. In one approach, the first device generates a digital fingerprint for the audio signal and uses the digital fingerprint to identify whether a content item in the audio signal is an interfering sound. In some examples, the first device then processes the audio signal by removing the interfering sound (or particular content item) from the audio signal to generate a processed audio signal, which only or primarily includes the user speech. The first device can then analyze the processed audio signal to determine when the audio signal lacks or does not include the user speech. In other examples, however, the first device may not process the audio signal to remove the interfering sound. Rather, in such examples, the first device can use the content item when analyzing the audio signal to determine when the audio signal lacks the user speech by determining when the audio signal only includes the content item (interfering sound).

In some examples, the first device may not be able to identify the content item and/or the interfering sound may include sounds from sources other than content items. In such examples, the first device can again generate a digital fingerprint of the interfering sound. The first device can then use the digital fingerprint to determine when the audio signal lacks user speech from the first user. In some examples, the first device can process the audio signal using the digital fingerprint by removing the interfering sound from the audio signal to generate a processed audio signal, which can include the user speech without the interfering sound. The first device can then analyze the processed audio signal to determine when the audio signal lacks the user speech.

In other examples, the first device can use the digital fingerprint of the audio signal as a reference for analyzing the audio signal. For instance, the first device can use the digital fingerprint to determine that the audio signal only includes the interfering sound, and hence lacks user speech.

In some examples, the first device can further perform speech recognition on the audio signal to determine when the audio signal lacks the user speech. For instance, the first device can use speech recognition to learn a voice associated with the first user (and/or other users) and/or a context in which the first user (and/or other users) speak. The first device can then perform voice recognition on the audio signal to determine that additional user speech (i.e., part of or all of the interfering sound) included in the audio signal is from another person based on a voice and/or context associated with the additional speech. The first device can then determine when the audio signal lacks the user speech of the first user by determining when a voice and/or context within the audio signal changes from the first user to the other person.

During the conversation, as user speech is detected and transmitted over the open communication channel, the first device further determines when the first user stops talking so that it can switch to a reception mode to receive communication back from the second user. This may be accomplished in many ways. In one approach, the first device detects the audio signal lacks speech of the first user for a threshold period of time. For instance, the first device may simply have a pre-set timeout after a lapse of time (e.g., one to a few seconds). Perhaps more intelligently, the first device may be configured with an algorithm that learns the speed in which the first user talks (as well as other users who may routinely use the first device). The first device can then utilize the results from the algorithm to set the threshold period of time. In some examples, the algorithm can set the time limit to include at least one of an average time between words in user speech, an average time between words in user speech plus (or minus) an additional time to account for error, or just a set period of time. In another approach, the first user (and/or one or more additional users) can set the time limit for the threshold period of time for the first device. The first user may set a threshold period of time that applies to a specific user of the first device, and/or the first user may set a threshold period of time that applies to two or more users of the first device.

When the first device fails to detect speech from the first user for a period of time during a conversation, it switches from transmission mode to reception mode. Similarly, the second device switches from reception mode to transmission mode to allow the second user to communicate back to the first user. The second device may make the switch on its own in the same that the first device did (i.e., it determines that the first user can finished talking for the moment) or it can alternatively receive notice from the first device that the first device has determined the first user has finished talking and is switching modes. In this manner, the first and second devices facilitate back and forth communication between the first and second users.

After the conversation between the first and second users concludes, the first device (and/or the second device) detects that the conversation is finished and closes the communication channel. In some examples, the first device determines the conversation is complete when the first device receives (either through the microphone or from the second device) audio signals that no longer include user speech from the first user and/or the second user. For instance, the first device may switch from a reception mode to a transmission mode while the communication channel is open. The first device can then receive an audio signal using the microphone of the first device. The first device can then analyze the audio signal to determine that the audio signal does not include any user speech (or at least does not include user speech from the first user), and determine that the conversation between the first user and the second user is finished.

The first and second devices can use one or more of the noise cancellations methods described above to account for interfering sounds included in the audio signals when determining when to close a communication channel. For instance, the first device can use the methods described above to determine that other human speech, background sound, and/or other sounds included in an audio signal include interfering sounds and not user speech from the first user and/or the second user. From this analysis, the devices can ascertain when the conversation between the first user and the second user is finished.

In still other examples, the devices may determine to close the communication channel as a result of receiving a communication from a third device. For instance, the first device can receive a communication from a third device and perform speech recognition on the communication to determine that a voice included in the communication is similar to a voice included in communications that were being received from the second device. Based at least in part on the determination, the first device can determine that the second user is now using the third device to communicate with the first user. For instance, the second user may have moved from one location (e.g., room) to another that caused a transition from using the second device to using the third device. In response, the first device closes the communication channel with the second device and opens a new communication channel with the third device.

In some examples, the first device can further determine to close the communication channel with the second device based on a trigger included in an audio signal that the first device receives from the microphone of the first device and/or from the second device. For instance, in some examples, the trigger can include one or more words that trigger the end of the conversation, such as "goodbye" or "see you later". In other examples, the trigger can include a context associated with user speech in the audio signal. For instance, the first device can determine that the first user is no longer talking to the second user, but that the first user is rather talking to another person, based on a context associated with user speech included in an audio signal. For example, if the first user is talking about sports with the second user through the communication channel, and then the first user starts talking about getting homework done, the first device can determine that the first user is no longer talking to the second user.

Once the conversation is completed, the first and second devices close the communication channel, which may be accomplished in various ways. For instance, the devices may temporarily pause any form of transmission/reception. As an alternative, each device can switch to the reception mode, with neither device in the transmission mode. In this way, the devices are each ready to capture the next speech input from a user via the microphone or to receive communication from another device to begin a new conversation.

It should be noted that in some examples, the first device (and/or the second device) could perform the noise cancellation methods described above for multiple users. For instance, two or more users may be using the first device to talk to one or more users using the second device. The first device can use the noise cancellation methods described above for the two or more users using the first device to determine when to open the communication channel with the second device, switch modes from the transmission mode to reception mode or from the reception mode to transmission mode, and/or close the communication channel with the second device.

The techniques described in this disclosure may be implemented in any number of systems and devices. One example device is described herein as a voice-enabled audio assistant that can interact with users via speech input and audio output. However, other forms of electronic devices may be configured to operate in the open microphone mode, and hence can implement the noise cancellation techniques described herein.

Figure 1B:
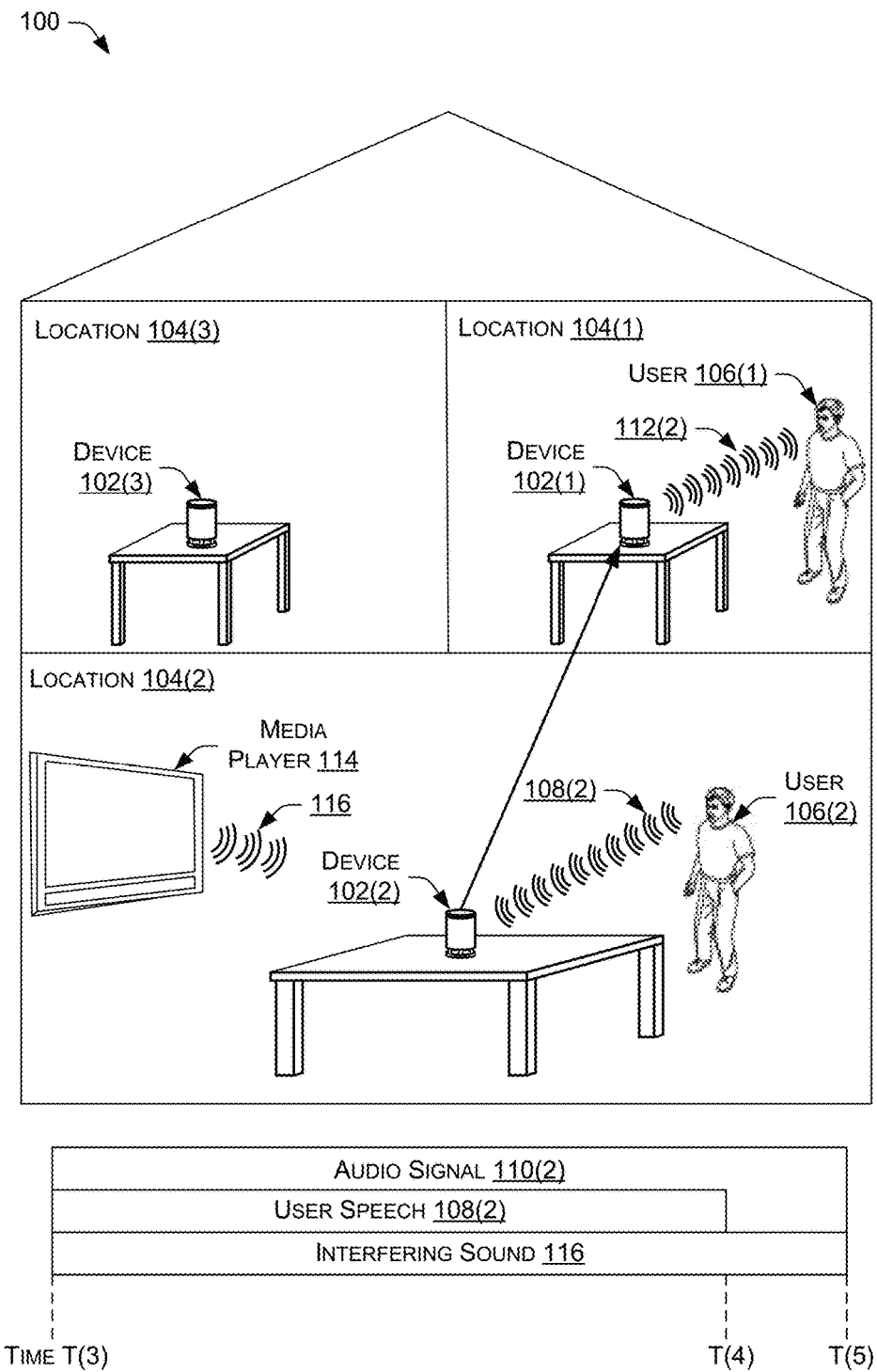
Figure 1C:
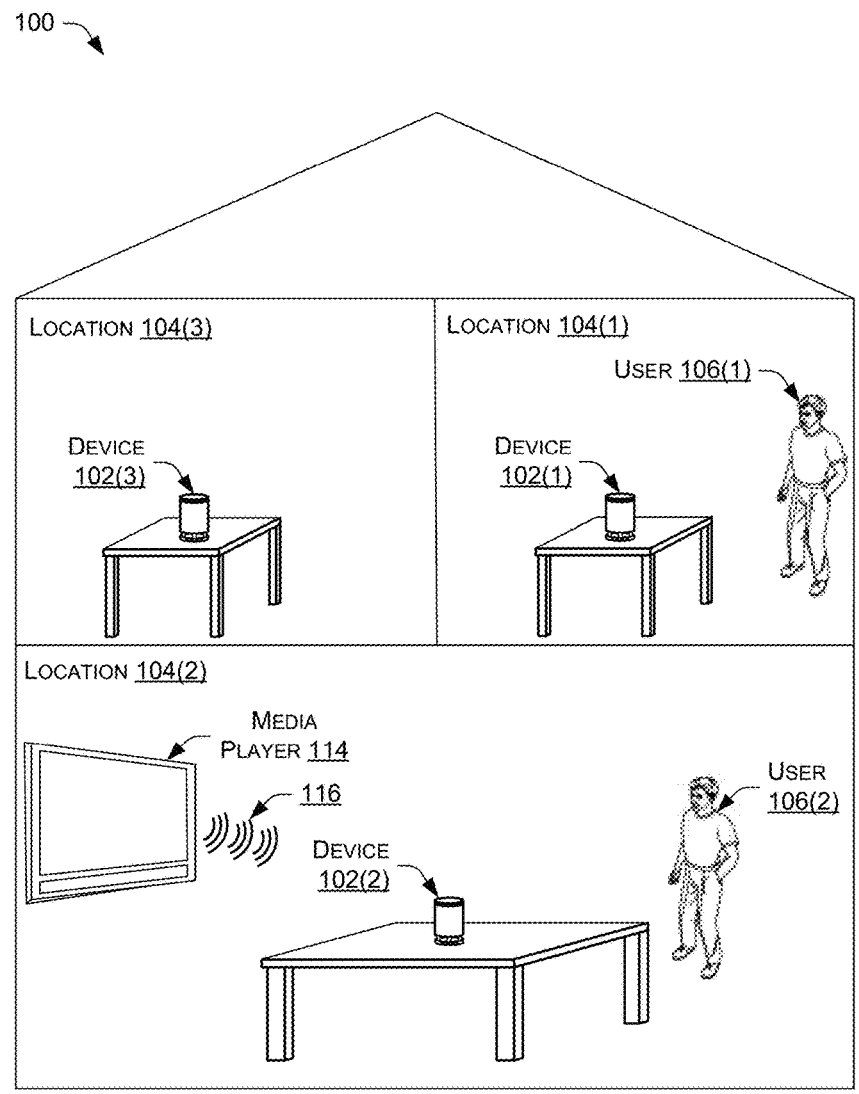

FIGS. 1A-1C illustrate various examples of an environment in which users employ electronic devices to communicate in an open microphone mode of operation. FIG. 1A illustrates a first example of an environment 100 having two or more electronic devices, such as device 102(1), device 102(2), and device 102(3) (collectively referred to as device 102 and/or devices 102). As illustrated in the example of FIG. 1, the environment 100 is set in the context of a home or residence, with each of the devices 102 being located in a different room or area of the residence. For instance, a first device 102(1) is placed in first location 104(1), such as a bedroom, a second device 102(2) is placed in second location 104(2), such as a living room, and a third device 102(3) is placed in third location 103(3), such as a bathroom. The locations 104(1)-(3) may be collectively referred to throughout this disclosure as location 104 and/or locations 104. While in this illustration each of the locations 104 represents a different room in environment 100, multiple devices may occupy the same room or other rooms may not have any device at all.

As further illustrated in FIG. 1A, a first user 106(1) is at the first location 104(1) and proximal to the first device 102(1). The first user 106(1) utilizes the first device 102(1) to communicate with a second user 106(2), who is at the second location 104(2) and utilizes the second device 102(2). The first device 102(1) (as well as the other devices 102(2) and 102(3)) is equipped with a microphone (as described below with reference to FIG. 2) that may receive audio input, such as speech from the user 106(1). The first device 102(1) is monitoring for and capturing sounds, in an effort to detect user speech 108(1) when spoken by the first user 106(1). When the user speaks, the first device 102(1) captures the user speech 108(1) and opens a communication channels with one or more of the other devices (illustrated in FIG. 1A as the arrows from device 102(1) to devices 102(2) and 102(3)). For examples, in response to a voice input 108(1) from the first user 106(1), the first device 102(1) can open communication channels with one or more of the second device 102(2) and the third device 102(3). In some contexts, the first device 102(1) that initiates this communication may be considered the originating device.

A communication channel may be considered opened when the originating source takes steps to send voice input from one user to another user. In one example, the first device 102(1) effectively opens communication channels with the other devices 102(2) and 102(3) by switching to a transmission mode. This may be accomplished, for example, by turning on a transmitter of the device 102(1) and/or optionally turning off a receiver of the device 102(1). The device 102(1) can then use the transmitter to send audio signals containing the user speech 108(1) to the other devices. For illustration purposes, the audio signal 110(1) is illustrated at the bottom of FIG. 1A, and it contains the user speech 108(1). In some contexts, the second and third devices 102(2) and 102(3) that receive the initial communication may be considered the destination devices.

In some configurations, the device 102(1) initiates the process of opening communication channels in response to receiving a trigger from the user 106(1). The trigger is a pre-known input, such as an audio input, that the user can provide to convey a desire to communicate through the device. The trigger may be, for example, one or more words or phrases that the user can say to initiate the user speech 108(1). For instance, the first user may say, "hello" or "open a channel" to inform the first device that she intends to talk to anther user. The trigger may also be a unique non-word sound that the user can use to express a desire to communicate. Alternatively, the trigger can include a context that is associated with user speech 108(1). In such examples, the device 102(1) receives and analyzes the audio signal 110(1) that includes user speech 108(1) to identify a context associated with user speech 108(1) and to open communication channels with device 102(2) and device 102(3) should a suitable context be identified. As an example of context, the user 106(1) may say something like, "John, are you available for dinner tonight?" to start a conversation with the second user 106(2) who is in a different location. In response to receiving that contextual sentence, the first device 102(1) may open a communication channel with each of the devices 102(2) and 102(3).

Before opening a communication channel with each of the devices 102(2) and 102(3), the first device 102(1) can first execute security measures. For instance, the first device 102(1) may include a black list, which includes a list of devices that the first device 102(1) cannot open communication channels with, and/or a white list of devices with which the first device 102(1) can open communication channels. For instance, the first device 102(1) may have to receive authorization from the other devices 102(2) and 102(3) before the first device 102(1) can open communication channels with the other device 102(2) and 102(3) (e.g., get listed in the white list). The authorization may include a code, a password, or an identity of the other devices 102(2) and 102(3).

In some examples and as illustrated in FIG. 1A, the first device 102(1) can then open a communication channel with each of the other devices in the environment 100 or within only one of the other devices (e.g., the second device 102(2)) in the environment 100. For instance, the first device 102(1) may know that the second user 106(2) is within the presence of the second device 102(2) and as such, the first device 102(1) may only open a communication with the second device 102(2). The first device 102(1) may know that the second user 106(2) is proximal to the second device 102(2) based on any number of factors, such as user speech indicating that the second user 106(2) is in the presence of the second device 102(2) (and/or at location 104(2)), storing a database that includes data indicating that the second device 102(2) is associated with second user 106(2), the second device 102(2) sensing the presence of the second user 106(2) and communicating that information to one or more other devices, and/or by any other methods for which the first device 102(1) could know that the second user 106(2) is in the presence of the second device 102(2).

For example, the second device 102(2) can include one or more sensors that detect the presence of the second user 106(2) at the second location 104(2) and/or near the second device 102(2). These sensors may include optical sensors, light sensors, imaging sensors, thermal sensors, infrared sensors, proximity sensors, presence sensors, motion sensors, or other sorts of sensors that can detect the presence of the second user 106(2) at the second location 104(2) and/or near the second device 102(2). In some examples, besides just detecting the presence of the second user at the second location 104(3) and/or near the second device 102(2), these sensors may further determine the identity of the second user 106(2). The second device 102(2) can then send the detection of the second user 106(2) and/or the identity of the second user to the first device 102(1).

After opening communication channels with each of the devices 102(2) and 102(3), the first device 102(1) can send the audio signal 110(1) that includes user speech 108(1) received from the first user 106(1) to the second device 102(2) and the third device 102(3) through the communication channels. At the start of the conversation, the audio signal 110(1) includes the trigger included in user speech 108(1), such as a word ("hello"), phrase (e.g., "open a channel"), or contextual speech (e.g., "John, what are you doing for dinner tonight?"). The first device 102(1) sends the audio signal 110(1) including the trigger to the second device 102(2) and/or the third device 102(3). In other examples, the first device 102(1) does not send the trigger received from the first user 106(1) to each of the other devices 102(2) and 102(3). For instance, when the trigger includes word or phrase intended only for the initiating device, such as the trigger word "activate," the first device 102(1) may choose not to send an audio signal that includes the trigger. In this case, the first device 102(1) may actively parse and remove the trigger word from the rest of the user speech 108(1) before sending the user speech as part of the audio signal 110(1).

As further illustrated in FIG. 1A, each of the second device 102(2) and the third device 102(3) receive the audio signal 110(1) from the first device 102(1), and process that audio signal 110(1) to retrieve and output the user speech 108(1) spoken by the first user 106(1). Each device is equipped with at least one speaker or other audio output to audibly emit the first user's speech, as represented in FIG. 1A by the audio speaker output 112 from the second device 102(2) and the third device 102(3). For example, and continuing the example above, the second and third devices 102(2)-(3) can emit audio speaker output 112 that includes the user speech 108(1) asking, "John, what are you doing for dinner tonight?"

It should be noted that as discussed above, in some examples, the first device 102(1) can first determine whether the trigger is valid before opening communication channels with the second device 102(2) and the third device 102(3). For instance, the first device 102(1) can identify a context associated with user speech 108(1) and based on the context, determine whether the trigger is valid. For example, if the trigger is in the middle of a sentence, such as "Your kid is active today" where "active" is the trigger, the first device 102(1) can determine that the first user 106(1) is talking to another person in location 104(1) and not to the first device 102(1). As a result, the first device 102(1) can then ascertain that that occurrence of the trigger is not valid and no channel should be opened.

Depending upon the conditions of the environment 100 during communication, there may be any number of noises or sounds that interfere with the communication. These background noises, sounds, audible emissions, background talk, ambient audio, and so forth may cause, separately or together, an interfering sound that degrades the quality of the audio signal carrying the user speech. To combat this interference, the first device 102(1) (as well as the other devices) are equipped with processing capabilities to perform noise cancellation on the audio signal 110(1). The noise cancellation attempts to remove or minimize the interfering sounds in the signal to better isolate the human speech. Through the noise cancellation process, the first device 102(1) may further determine whether the trigger received by the device was something the user intended to say as part of her speech 108(1) or if the trigger was erroneously part of the interfering sound.

For instance, the audio signal 110(1) may include interfering sound from a content item that is being output by a media device in location 104(1) (not shown), wherein that content item contains the trigger. The first device 102(1) can take a digital fingerprint of the audio signal 110(1) to determine the identity of the content item, as will be discussed below in more detail with regard to FIG. 6. The device 102(1) can determine whether the trigger was from the identified content item or if the trigger was from the first user 106(1) as part of the user's speech 108(1). In some configurations, if the first device 102(1) determines that the trigger was included in the interfering sound, the first device 102(1) will not open the communication channels with the other devices 102(2) and 102(3).

After the user stops speaking, one or both of the first and second devices 102(1)-(2) may determine that the first user 106(1) is finished talking, indicating the end of the user speech 108(1) from the first user 106(1). For instance, the first device 102(1) may analyze the audio signal 110(1) to determine when the audio signal 110(1) lacked the user speech 108(1) from the first user 106(1) for a threshold period of time. For example, the first device 102(1) can determine that user speech 108(1) ended at time T(1), by virtue of monitoring and analyzing the audio signal for a threshold period of time beyond time T(1) to time T(2). This is representative of a scenario where the first user 106(2) has finished talking for a moment and is now awaiting a response from the other user 106(2).

FIG. 1B illustrates a second example of the environment 100 in which two users are utilizing respective devices to communicate via an open microphone mode of communication. For discussion purposes, FIG. 1A is representative of a first period of time when the first user 106(1) begins a conversation with the second user 106(2) and thus directs the first device 102(1) to open a communication channel with each of the second device 102(2) and the third device 102(3). FIG. 1B is representative of a second period of time when the second user 106(2) responds to the first user 106(1), thereby directing the second device 102(2) to transmit user speech back through the communication channel that is open between the first device 102(1) and the second device 102(2).

In FIG. 1B, one or both of the first and second devices 102(1)-(2) has already determined that the first user 106(1) has finished talking, indicating the end of the user speech 108(1) illustrated in FIG. 1A from the first user 106(1). In response, the first device 102(1) switches from a transmission mode to a reception mode by turning off the transmitter of the first device 102(1) and/or turning on the receiver of the first device 102(1) if the receiver is not already turned on. Additionally, the second device 102(2) (and potentially the third device 102(3)) switches from a reception mode to a transmission mode by turning on a transmitter of the second device 102(2) and/or optionally turning off a receiver of the second device 102(2). The second device 102(2) (and optionally the third device 102(3)) may further open (turn on) a microphone of the second device 102(2) if the microphone was closed (turned off) while the second device 102(2) was in the receiving mode.

As illustrated in FIG. 1B, the second user 106(2) is at the location 104(2) and is using the second device 102(2) to respond to the first user 106(1). For instance, the second device 102(2) is receiving user speech 108(2) from the second user 106(2) and sending an audio signal representation of that user speech 108(2) to the first device 102(1) through the opened communication channel between the devices (illustrated by the arrow). The user speech 108(2) is played out over a speaker at the first device 102(1), as represented by the audio speaker output 112(2). In this way, the first user 106(1) can hear the second user's response to his earlier speech.

The third device 102(3) does not send any communications to the first device 102(1) through the communication channel opened with the first device 102(1) since there is no user in the location 104(3) to provide speech input. If the delay persists for a long period of time, as defined by a second threshold period of time, one or both of the first device 102(1) and the third device 102(3) can close the communication channel between them. For instance, the third device 102(3) can switch from the transmission mode back to the reception mode by turning off the transmitter of the third device 102(3) and/or turning on the receiver of the third device 102(3) if the receiver is not already turned on.

As further illustrated in FIG. 1B, a media player 114, which is shown embodied as a wall-mounted television or display, is outputting interfering sound 116 within the second location 104(2). For instance, the second user 106(2) may be watching or listening to a show or program (e.g., a content item) playing on media player 114, where interfering sound 116 corresponds to background sounds and/or human talk included in the content item. A microphone of the second device 102(2) receives the interfering sound 116 output from media player 114 at the same time as it receives the user speech 108(2) from the second user 106(2). Since the microphone is receiving both the user speech 108(2) and the interfering sound 116, an audio signal 110(2) (illustrated at the bottom of FIG. 1B) captured by the second device 102(2) includes both audio components of the user speech 108(2) and the interfering sound 116. For discussion purposes, the audio signal 110(2) is shown being initiated at a time T(3) after the first audio signal 110(1) is fully captured at time T(2) in FIG. 1A. The second user's speech 108(2) ends at a time T(4), while the interfering sound 116 continues for the entire length of the audio signal 110(2) at time T(5).

The interfering sound 116 included in audio signal 110(2) can cause degrade the communication between the first device 102(1) and the second device 102(2). For instance, the second device 102(2) may stay in a transmission mode as long as the microphone of second device 102(2) is receiving sound. Therefore, the interfering sound 116 can cause the second device 102(2) to stay in the transmission mode even though the second user 106(2) is finished speaking and the second device 102(2) is done receiving the user speech 108(2). If second device 102(2) stays in the transmission mode, it is not able to stop, send the communications to the first device 102(1) over the communication channel, and then switch back to a reception mode to receive the next response from the first user 106(1).

Accordingly, the second device 102(2) performs noise cancellation while processing the audio signal 110(2) to remove or reduce the interfering sound from the signal and to leave a cleaner signal for determining when the audio signal 110(2) lacks the user speech 108(2) for a threshold period of time. The second device 102(2) may use any number of noise cancellation techniques. In one approach for situations involving background media noise (such as program content from media player 114), the second device 102(2) can take a sample (digital fingerprint) of a portion of the audio signal 110(2). The second device 102(2) can then obtain and/or access a database of reference content items and see if the sample matches or is similar to at least one content item there, thereby indicating that the portion of the audio signal is being produced by the media player and hence is part of the interfering sound 116. The device 102(2) can then use the identity of the content item to determine when audio signal lacks user speech 108(2).

In some examples, the second device 102(2) may first use the identified content item to process audio signal 110(2) by removing, reducing, or otherwise cancelling the interfering sound 116 from audio signal 110(2). The second device 102(2) can then use the processed audio signal to determine when the audio signal 110(2) lacks the user speech 108(2) as an indication that the user has stopped talking, at least temporarily, in the conversation. By cancelling the interfering sound 116 from the audio signal 110(2), the primary component will be the user's speech 108(2). Using various processing techniques, such as signal strength, voice recognition, etc., the second device 102(2) can then cleanly determine when the second user 106(2) ceased talking, even if the program on the media player 114 continues to provide verbal input.

Still, in other examples, the second device 102(2) can determine when audio signal 110(2) lacks user speech 108(2) using a voice and/or context associated with user speech 108(2). For instance, suppose the interfering sound 116 includes additional human speech from the content item playing on media player 114 and/or additional human speech from other people at the location 104(2) (not shown). The second device 102(2) can determine when a voice (or context) of speech included in audio signal 110(2) changes from the voice (or context) associated with the user speech 108(2) to a voice (or context) associated with the other person captured as part of the interfering sound 116. For example, the user speech 108(2) may include the first user 106(2), who is an adult male saying, "I am cooking pasta for dinner tonight," while the interfering sound 116 output by media player 114 includes a female character who is saying, "just keep swimming, swimming, swimming." The device 102(2) can analyze the audio signal 110(2) to determine that the audio signal 110(2) lacks speech input from the target user 106(2). The analysis may differentiate between the two speakers (i.e., a male voice vs a female voice) and/or notice that the context of the conversation has changed, and potentially abruptly, from talking about dinner plans to talking about swimming.

It should be noted that in some examples, to perform the noise cancellation methods described above, the second device 102(2) can capture an initial audio signal before second device 102(2) starts capturing the audio signal 110(2) and/or sending communications to the first device 102(1) through the communication channel. The second device 102(2) can then use the initial audio signal to perform the noise cancellation methods described above. For instance, the second device 102(2) can capture an initial audio signal that includes the interfering sound 116 from the second location 104(2) without any user speech 108(2). The second device 102(2) can then use the initial audio signal as a sample and/or digital fingerprint when removing, reducing, or otherwise canceling the interfering sound 116 from the audio signal 110(2). Additionally or alternatively, the second device 102(2) can use the initial audio signal to determine a voice (or context) associated with human speech included in the interfering sound 116. The second device 102(2) can then use the voice (or context) associated with the human speech to determine when a voice (or context) of speech included in audio signal 110(2) changes from the voice (or context) associated with the user speech 108(2) to a voice (or context) associated with the human speech captured as part of the interfering sound 116 included in the initial audio signal.

For example, the second device 102(2) can capture an initial audio signal that includes the interfering sound 116 without the user speech 108(2) before the second device 102(2) sends communications to the first device 102(1). The second device 102(2) can then use the initial audio signal to determine a content item associated with the interfering sound 116 using a digital fingerprint of the initial audio signal. After determining the content item, the second device 102(2) can process the audio signal 110(2) to at least partly cancel the interfering sound 116 from the audio signal 110(2) and determine when the processed audio signal 110(2) lacks the user speech 108(2) after the interfering sound 116 is at least partly canceled.

For another example, the second device 102(2) can perform speech recognition on an initial audio signal that includes the interfering sound 116 without the user speech 108(2) to identify a voice identity (or context) associated with human speech from the interfering sound 116. The second device 102(2) can then perform speech recognition on the audio signal 110(2) to identify a voice identity (or context) associated with the user speech 108(2) from the second audio signal 110(2). The second device 102(2) can then detect when the voice identity (or context) associated with the user speech 108(2) included the audio signal 110(2) changes to the voice identity (or context) associated with the human speech included in the interfering sound 116.

When analyzing the audio signal 110(2), the second device 102(2) may detect when the audio signal 110(2) ceases having a component of the user speech 108(2) for a threshold period of time. For instance, the second device 102(2) can start receiving the audio signal 110(2) at time T(3) and through processing, determine that audio signal 110(2) contains the user speech 108(2) for a period of time. At time T(4), the second device 102(2) determines that the signal no longer contains the second user's speech 108(2) and/or determine that the component of the user speech 108(2) does not include a signal strong enough to indicate presence of the user speech 108(2) in the audio signal 110(2). Rather than switching modes at time T(4), however, the second device 102(2) may wait until the audio signal lacks the user speech 108(2) and/or the signal strong enough to indicate the presence of the user speech 108(2) for a threshold period of time, such as until time T(5). By waiting the threshold period of time, the second device 102(2) ensures that the second user 106(2) is not just pausing during the user speech 108(2) and that the second user 106(2) is actually finished with his message to the first user 106(1).

Based on a determination that audio signal 110(2) no longer contains the user speech 108(2), the second device 102(2) can change back from the transmission mode to the reception mode to await a response from the first device 102(1). For instance, the second device 102(2) can turn off its transmitter and/or turn on its receiver if the receiver is not already turned on. The second device 102(2) may further close (turn off) the microphone of device 102(2) so that device 102(2) stops capturing sounds from the various sources in location 104(2). Additionally, the first device 102(1) can separately determine that the second device 102(2) is done sending audio signals through the communication channel and switch from the reception mode back to the transmission mode. For instance, the first device 102(1) can turn on the transmitter and optionally turn off the receiver so that it can once again receive a spoken reply from the first user 106(1), which the first device 102(1) then sends to the second device 102(2).

FIG. 1C illustrates a third example of an environment 100 in which users use devices to communicate using an open microphone mode of communication. FIG. 1C is representative of a third period of time in which the first device 102(1) and the second device 102(2) determine that the conversation between the first user 106(1) and the second user 106(2) is finished and close the communication channel between device 102(1) and device 102(2).

In some examples, the first device 102(1) can determine that the conversation between the users 106(1) and 106(2) is finished based on no longer receiving speech input from the first user 106(1). This determination may include a time element, wherein a period of time lapses from the last speech input from the first user 106(1). In one implementation, this period may be set longer than the threshold time period in an ongoing conversation. For instance, the concluding period may be several seconds (e.g., more than 10 seconds) after the final speech input from the first or second user.

In another example, the first device 102(1) may detect a predefined closing trigger, such as a word or phrase (e.g., "goodbye", "see you later", "let's talk again", etc.) or a sound or sequence of sounds or some other user input. Further, the first device 102(1) may use speech recognition to understand that the users are ending a conversation, by parsing the speech and recognizing that it as a terminating communication (e.g., "Okay, thanks for chatting and I'll talk to you later").

In still other situations, the first device 102(1) may determine that the conversation is over by analyzing the audio signals it receives in the location 104(1) and determining that the audio signals only include interfering sounds without any user speech from user 106(1). When the user speech is absent, and the audio signals contain primarily, if not exclusively, the interfering sounds, the first device 102(1) may interpret that situation as the conversation being finished.

When the conversation is deemed over, the first device 102(1) may switch from the transmission mode back to the reception mode by turning off the transmitter of device 102(1) and turning on the receiver of device 102(1) if the receiver is not already turned on. The first device 102(1) can then actively listen for user speech and/or await a transmission from another device.

Additionally, the second device 102(2) can determine that the conversation between user 106(1) and user 106(2) is finished when it stops receiving any more communications from the first device 102(1) through the communication channel. In response, the second device 102(2) can stay in the receiving mode and wait for either the second user 106(2) (and/or one or more other users) to open another communication with another device and/or the second device 102(2) can wait to receive a communication from another device.

Although not illustrated in FIGS. 1A-1C, the first device 102(1) and/or the second device 102(2) can further determine to close the communication channel between the devices 102(1) and 102(2) based on receiving a communication from the third device 102(3). For instance, suppose the first user 106(1) walks from the first location 104(1) to the third location 104(3) in the environment 100. When the first user 106(1) changes locations, she can transition from using the first device 102(1) to using the third device 102(3). The second device 102(2) can receive a communication from the third device 102(3) and perform speech recognition on the communication to identify the speech as belonging to the first user 106(1). The second device 102(2) interprets this to mean that the first user 106(1) is now using the third device 102(3) to communicate with the second user 106(2). In response, the second device 102(2) can close the communication channel between the first device 102(1) and the second device 102(2).

Figure 2:
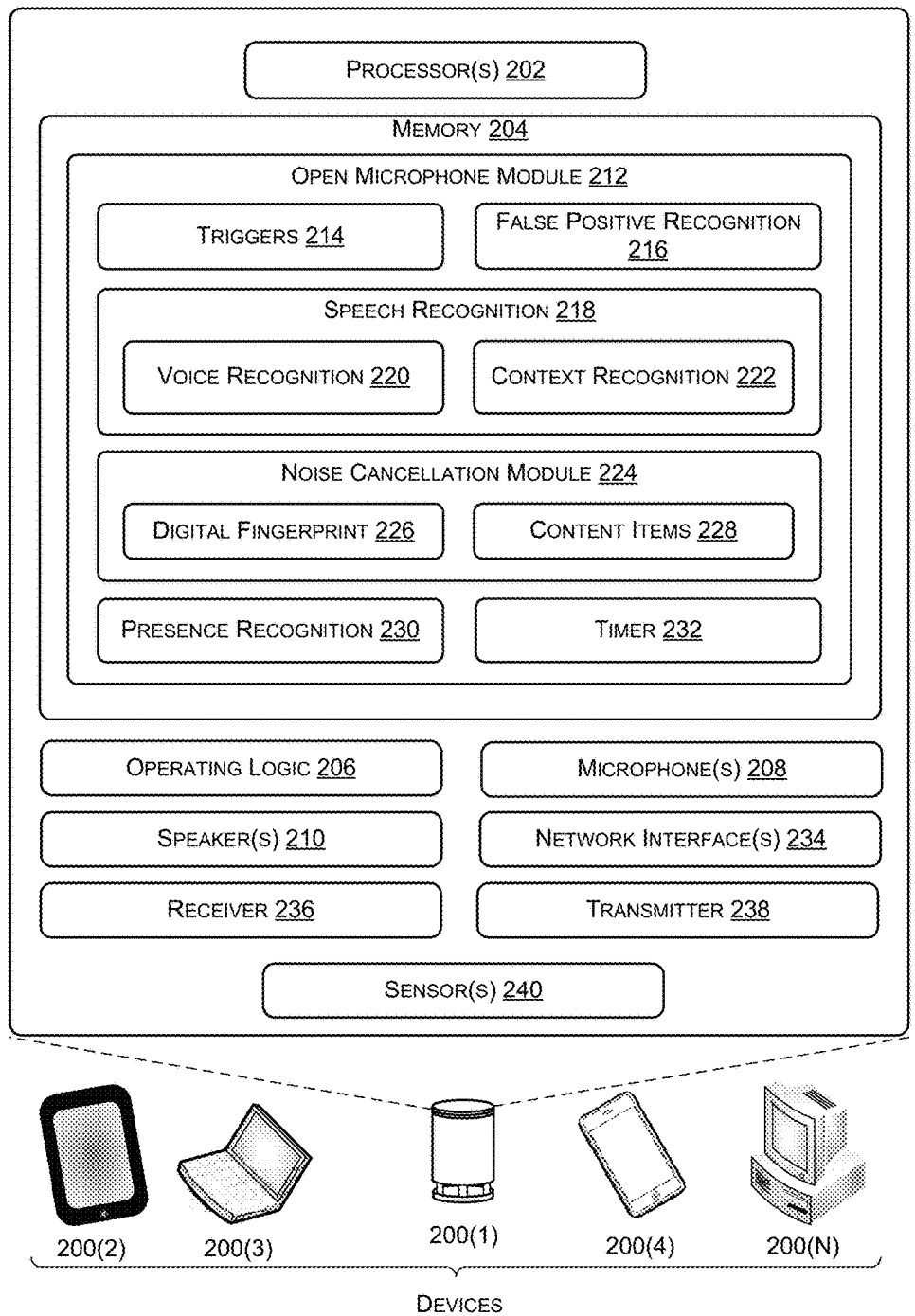
FIG. 2 is a block diagram illustrating relevant functional components of an example electronic device employed in FIGS. 1A-1C to facilitate speech interaction with users.
Figure 3B:
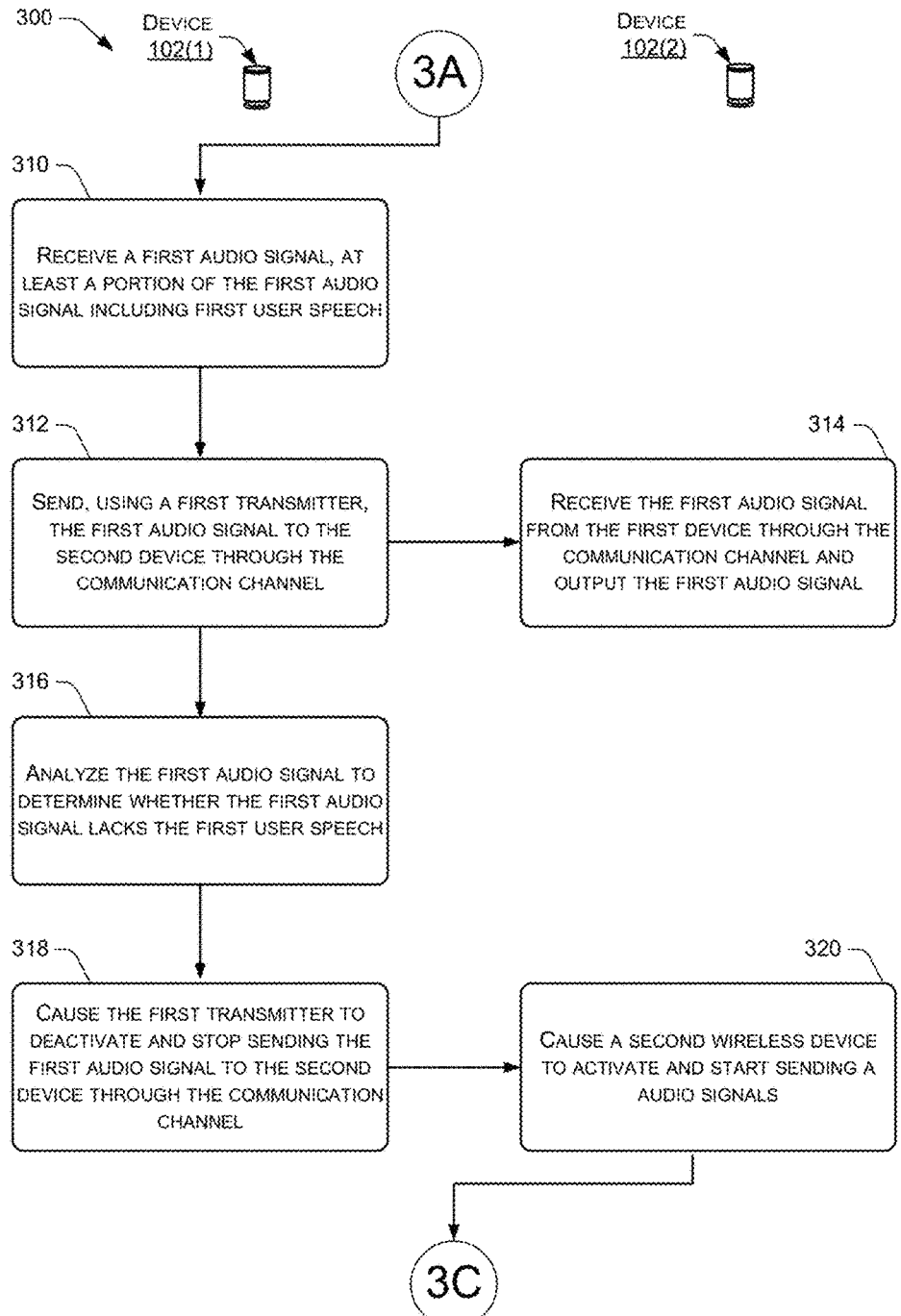
Figure 3C:
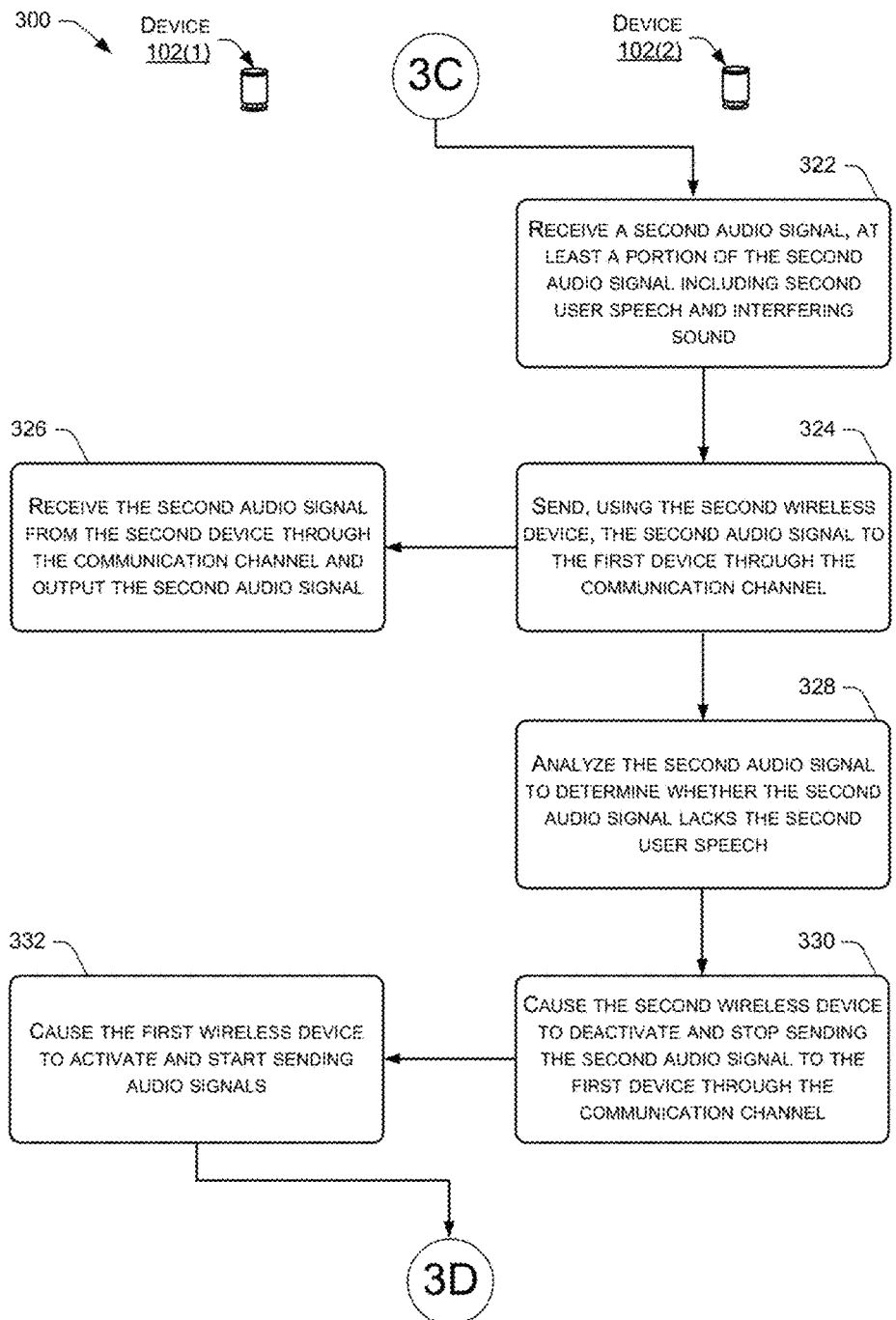
Figure 3D:
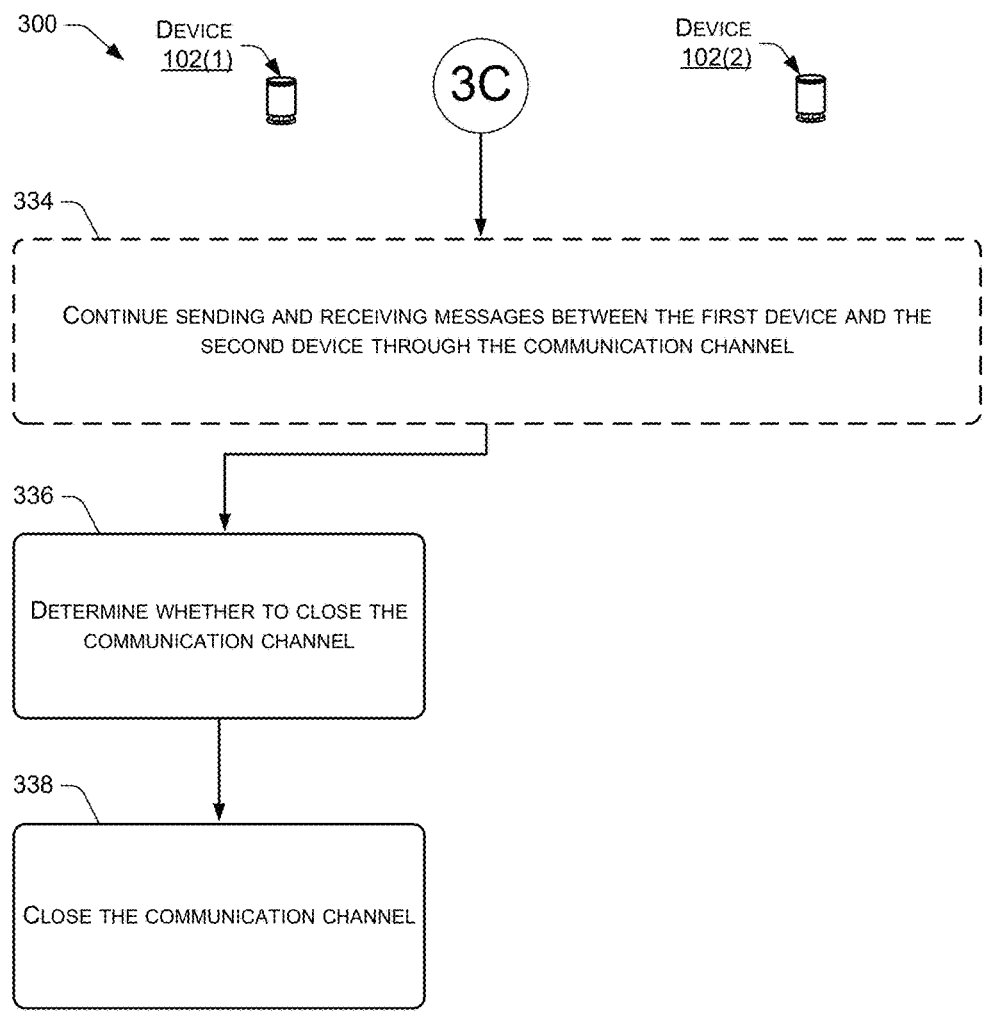

FIG. 2 is a block diagram illustrating relevant functional components of an example device 200(1), such as one or more of the devices 102(1)-(3) from FIGS. 1A-1C. While select components are illustrated, the device 200(1) may include other components that are not shown in FIG. 2. Additionally, although FIG. 2 only illustrates the relevant functional components of device 200(1), the functional components may further be included in each of devices 200(2)-(N). Devices 200(2)-(N) can include tablet computers 200(2), laptop computers 200(3), mobile phones 200(4), desktop computers 200(N), server computers, web-server computers, personal computers, thin clients, terminals, personal data assistants (PDAs), work stations, integrated components for inclusion in a computing device, or any other sort of computing device.

Logical functionality of the device 200(1) may be implemented by one or more processor(s) 202, associated memory 204, and software that is stored in the memory 204 and executed by the processor(s) 202. The software may comprise computer-executable instructions or programs. The one or more processor(s) 202 may include one or more processors having multiple cores as well as digital signal processors, application-specific integrated circuits (ASICs) and/or other types of processing devices. The memory 204 may be a type of non-transitory computer storage media and may include volatile and nonvolatile memory. Thus, the memory 204 may include, but is not limited to, RAM, ROM, EEPROM, flash memory, magnetic memory media, optical memory media, or other memory technology. The memory 204 may also comprise media that is used for transferring data and software, such as CD-ROMs, DVDs, memory sticks, etc. The memory 204 may reside in or be provided by various components of the device 200(1). The memory 204 may be external to device 200(1) and may be accessed through network communications or other interfaces including wireless interfaces.

Software of the device 200(1) may include operating logic 206 that implements general functionality of the device 200(1) as described herein. The operating logic 206 may include an operating system, drivers for physical elements of the device 200(1), applications for performing specific functions or tasks, communication interfaces, etc.

The device 200(1) may have one or more input microphone(s) 208 and one or more speaker(s) 210 to facilitate audio interactions with a user, such as the first user 106(1) and/or the second user 106(2). The input microphone(s) 208 produce one or more audio signals representing ambient audio such as sounds uttered by a user (e.g., user speech 108(1), user speech 108(2)) or other sounds (e.g., interfering sound 116) within an environment, such as environment 100. The audio signals produced by the microphone(s) 208 may also contain delayed audio components from the speaker(s) 210, which may be referred to herein as echoes, echo components, or echoed components. Echoed audio components may be due to acoustic coupling, and may include audio components resulting from direct, reflective, and conductive paths. On some embodiments, the one or more microphone(s) 208 may comprise a microphone array suitable for use in audio beamforming or sound source localization (SSL).

The device 200(1) can include an open microphone module 212, which may include functionality for processing input audio signals by the microphone(s) 208. For instance, the device 200(1) may utilize the open microphone module 212 to perform the noise cancelling functions described above during communications between users.

In some examples, the open microphone module 212 can include one or more triggers 214 and logic for false positive recognition 216. Triggers 214 can include programmed triggers that the device 200(1) listens for when opening communication channels with other devices. For instance, the triggers 214 can include one or more triggering words, a programmed context for user speech, and/or any other triggers that the device 200(1) can listen for to open communication channels. In some examples, the open microphone module 212 uses the false positive recognition logic 216 to determine whether one of the triggers 214 is valid. For instance, and as discussed above, the device 200(1) can use false positive recognition 216 to distinguish whether one of the triggers 214 was included in user speech 108(1) or in interfering sounds (e.g., such as programming content from a radio or television).

In some examples, the open microphone module 212 can include speech recognition 218. The open microphone module 212 can utilize speech recognition 218 to analyze audio signals by performing both voice recognition 220 and context recognition 222. For instance, the open microphone module 212 can perform speech recognition 218 on the audio signal 110(2) to parse speech input and convert it to a form that can be processed and interpreted. In some cases, the speech recognition 218 may be used to identify a voice associated with the speech as belonging to a particularly user, such as the user speech 108(1) form the first user 106(1) or the user speech 108(2) from the second user 106(2). The open microphone module 212 can further perform speech recognition 218 on audio signal 110(2) and use the context recognition 222 to determine a context associated with speech included in the audio signal 110(2). In some examples, the context recognition 222 may be implemented using natural language processing (NLP) or other techniques that attempt to ascertain meaning within the parsed verbal input.

The open microphone module 212 is further equipped with noise cancellation module 224. This module is shown as software elements stored in the memory 204 a processed by the processor(s) 202, but in other implementations, they may be implemented in how or in part by hardware and/or firmware. Generally, the noise cancellation module 224 may be used to remove or reduce unwanted components in the audio signal to better isolate the user speech input. In some cases, the noise cancellation module 224 may utilize functionality to create a digital fingerprint 226 of an audio signal. This digital fingerprint uniquely represents the all or various components within the audio signal that may be rapidly compared to other fingerprints for possible matches. The digital fingerprints may be used to ascertain whether parts of the audio signal come from sources other than the user speech.

In this manner, the open microphone module 212 utilizes the noise cancellation module 224 to identify whether one or more content items 228 match the digital fingerprint 226. The content items 228 represent audio segments taken from known programming content that may be the cause or source of interfering sounds. The audio segments may cover all or portions of the programming content. In some implementations, the content items 228 are stored in a format similar to a digital fingerprint for ease of comparison. The content items 228 are shown being stored locally, as the device 200(1) may temporarily store the content items 228 associated with content being played on other player devices in the environment, such as current television programming or radio programming. In other implementations, the content items may be maintained in data stores remote from the device 200(1), but are retrieved for use by the device 200(1) when the programming content is being played locally. The digital fingerprint 226 may be compared against all or some of the content items 228 for a potential match. When a match occurs, the open microphone module 212 determines that the content item playing on the media player 114 is the interfering sound 116, and thus can be removed from the audio signal.

The open microphone module 212 may further include a presence recognition module 230 to determine when a user moves from using one device to another. The presence recognition module 230 may determine that the user has moved to another device in several ways. In one approach, the presence recognition module 230 may examine the strength of the audio signals associated with the user's voice. As the strength falls below a threshold level, the presence recognition module 230 may deem that the user has moved to another more proximal device.

In another approach, the device 200(1) periodically communicates with other devices in the area. Part of the information shared among the devices may be the identities of speaking users and respective signal strengths of signals created from receipt of their verbal output. Suppose, for example, that the presence recognition module 230 of device 200(1) determines that the signal strength of the signal associated with the user provided by another device is greater by a predefined margin than the signal strength of its own audio signal of the user. In response, the presence recognition module 230 may determine that the user has moved closer to the other device, and hence continuing communication in the conversation should be switched to that device.

In some examples, the open microphone module 212 may also be enabled with a timer 232 to track various times, such as the periods of time after a user stops speaking. For instance, the timer 232 may be used to determine when the audio signal lacks user speech for a threshold period of time by measuring the times between times T(1) and T(2) in FIG. 1A or times T(4) and T(5) in FIG. 1B.

The device 200(1) may further include one or more network interface(s) 234 for communicating over a network with other devices. The network interface(s) 234 may comprise a wireless network interface such as a WiFi® interface, Bluetooth interface, a near field communication interface (NFC) interface, or may comprise any of various other types of interfaces. In many cases, the network interface(s) 234 may be configured to communicate with a local wireless access point and/or router located within the environment 100, and which in turn is configured to provide communications over a public network.

The device 200(1) may further have an over-the-air (OTA) receiver 236 or broadcast receiver for receiving terrestrial broadcasts, including radio and television broadcasts. In some cases, the OTA receiver 236 may be implemented as a software-defined radio or tuner. The OTA receiver 236 may be tunable to receive and demodulate different broadcasts, stations, channels or frequencies. The OTA receiver 236 may in some cases have multiple demodulation channels for receiving and concurrently demodulating multiple broadcasts. A similar receiver or tuner may be configured to receive and/or decode other types of broadcasts, such as cable network broadcasts or other wire-based broadcasts.

The device 200(1) may further be equipped with an over-the-air (OTA) transmitter 238 or broadcast transmitter for sending terrestrial broadcasts, including radio and television broadcasts. The OTA transmitter 238 may be tunable to send different broadcasts, stations, channels or frequencies. The OTA transmitter 238 may in some cases have multiple demodulation channels for sending multiple broadcasts. In some examples, device 200(1) may include a transceiver that includes both receiver 236 and transmitter 238. In other examples, network interface(s) 234 may include one or more of receiver 236 and transmitter 238.

The device 200(1) may utilize the receiver 236 and the transmitter 238 to communicate with a second device using a half-duplex communication system, which provides communications in both directions through a single communication channel. Because the devices communicate through a single communication channel, only one device is able to send communications at a single time. As such, the device 200(1) turns on and off the receiver 236 and/or the transmitter 238 while communicating with the second device through the communication channel. For instance, in order for the device 200(1) to send a first communication to the second device, the device 200(1) switches to a transmission mode by turning on the transmitter 238 and uses the transmitter 238 to send the first communication to the second device. The device 200(1) may optionally turn of the receiver 236 so that the device 200(1) stops receiving communications from the second device and/or any other device.

After the device 200(1) is finished sending the first communication to the second device, the device 200(1) then switches to a reception mode to receive a second communication from the second device. To accomplish this, the device 200(1) turns off the transmitter 238 in order to stop sending the first communication to the second device and further turns on the receiver 236 in order to receive the second communication from the second device using the receiver 236. The device 200(1) stays in the reception mode until the device 200(1) stops receiving the second communication from the second device, at which point the device 200(1) switches back to a transmission mode to send a third communication to the second device. To accomplish this, the device 200(1) again turns on the transmitter 238 to send the third communication to the second device using the transmitter 238 and optionally turns off the receiver 236 to stop receiving communications from the second device and/or any other device.

The device 200(1) can continue this "back and forth" switching from the transmission mode to the reception mode while the device 200(1) is communicating with the second device using the half-duplex communication system by turning on and off the receiving 236 and/or the transmitter 238. This allows the device 200(1) to communicate with the second device through the single communication channel.

The device 200(1) may further be equipped with sensor(s) 240 for detecting the presence of a user. The sensor(s) 240 may include optical sensors, light sensors, imaging sensors, thermal sensors, infrared sensors, proximity sensors, presence sensors, motion sensors, or other sorts of sensors that can detect the presence of a user. In some examples, besides just detecting the presence of a user, the sensor(s) 240 may further determine the identity of the user. For instance, if the sensor(s) 240 include an imaging sensor, the device 200(1) can use the imaging sensor to capture an image of the user when the user is in the presence of the device 200(1). The device 200(1) can then use the image of the user to determine the identity of the user, such as by using facial recognition on the image.

FIGS. 3A-8 are flow diagrams of illustrative processes for utilizing noise cancellation during an open microphone mode of communication between devices. The processes are illustrated as a collection of blocks in a logical flow graph, which represent a sequence of operations that can be implemented in hardware, software, or a combination thereof. The blocks are referenced by numbers. In the context of software, the blocks represent computer-executable instructions stored on one or more computer-readable media that, when executed by one or more processing units (such as hardware microprocessors), perform the recited operations. Generally, computer-executable instructions include routines, programs, objects, components, data structures, and the like that perform particular functions or implement particular abstract data types. The order in which the operations is described is not intended to be construed as a limitation, and any number of the described blocks can be combined in any order and/or in parallel to implement the process. The processes may be executed, at least in part, using one or more devices, such as devices 102 and device 200(1) discussed above with reference to FIGS. 1A-2.

FIGS. 3A-3D are a block diagram of an illustrative process 300 for utilizing noise cancellation during an open microphone mode of communication between devices. As illustrated in FIGS. 3A-3D, the blocks on the left side are performed by a first device and the blocks on the left side are performed by a second device, such as the first device 102(1) (or an originating device) and the second device 102(2) (or a destination device) from FIGS. 1A-1C.

At 302, the first device 102(1) monitors for a trigger. For instance, the first device 102(1) can be set in a monitoring mode where the first device 102(1) actively monitors for a trigger from a user and/or a communication from another device. While in the monitoring mode, the first device 102(1) may not be sending any communications to other devices until the first device 102(1) receives the trigger.

At 304, the first device 102(1) receives the trigger, where the trigger is predefined to cause the first device 102(1) to open a communication channel with the second device 102(2). For instance, while in the monitoring mode, the first device 102(1) may receive an audio signal 110(1) that includes the trigger using a microphone 208 of the first device 102(1). The trigger is a pre-known input, such as an audio input, that the first user 106(1) can provide to convey a desire to communicate through the first device 102(1). In some examples, the first device 102(1) may analyze the trigger to determine whether the trigger is valid, which is discussed below with regard to FIG. 7.

At 306, the first device 102(1) executes security measures to determine whether to open a communication channel with the second device 102(2). For instance, the first device 102(1) can determine whether the second device 102(2) is on a black list, which includes a list of devices that the first device 102(1) cannot open communication channels with, and/or a white list of devices with which the first device 102(1) can open communication channels. Additionally, the first device 102(1) may determine whether the second device 102(2) is deactivated and/or currently busy, such that the first device 102(1) cannot open a communication channel with the second device 102(2).

At 308, the first device 102(1) opens the communication channel with the second device 102(2). For instance, the first device 102(1) can switch to a transmission mode by turning on or activating a transmitter of the first device 102(1). The first device 102(1) may further turn off or deactivate a receiver of the first device 102(1).

At 310, the first device 102(1) receives sound from the environment and generates an audio signal 110(1) that includes the first user speech 108(1). For instance, the first device 102(1) can actively listen for and capture the audio signal 110(1) via the microphone(s) 208, which includes the user speech 108(1) from the first user 106(1).

At 312, the first device 102(1) sends the audio signal to the second device 102(2). In one implementation, the first devices 102(1) uses the transmitter 238 to send the audio signal 110(1) to the second device 102(2) through the communication channel since the first device 102(1) is in a transmission mode.

At 314, second device 102(2) receives the audio signal 110(1) from the first device 102(1) through the communication channel and outputs the audio signal 110(1) via its speaker as the audio speaker output 112(1). In this manner, the voice input spoken by the first user 106(1) is played audibly for the second user 106(2) to hear. The second device 102(2) receives the audio signal 110(1) from the first device 102(1) using a receiver (e.g., receiver 236) of the second device 102(2) since the second device 102(2) is in a reception mode. The second device 102(2) can then process the audio signal 110(1) to retrieve the user speech 108(1) spoken by the first user 108(1) and audibly emit the user speech 108(1) as audio speaker output 112(1) to the second user 106(2).

At 316, the first device 102(1) analyzes the audio signal 110(1), either routinely or continuously, to determine whether the audio signal 110(1) lacks the user speech 108(1), indicating that the first user 106(1) has stopped talking. In some examples, the first device 102(1) determines when the audio signal 110(1) lacks a signal strong enough to indicate a presence of the user speech 108(1) from the first user. In some examples, the first device 102(1) determines whether the user speech 108(1) has been missing from the audio signal 110(1) for a threshold period of time (e.g., a few seconds). For instance, the first device 102(1) can analyze the audio signal 110(1) to determine that the user speech 108(1) ended at time T(1), by virtue of monitoring and analyzing the audio signal 110(1) for a threshold period of time beyond time T(1) to time T(2).

At 318, the first device 102(1) deactivates the first transmitter and stops sending the audio signal 110(1) to the second device 102(2) over the open communication channel. In this act, the first device 102(1) essentially switches from a transmission mode to a reception mode by turning off or deactivating the transmitter of the first device 102(1) and turning on or activating a receiver of the first device 102(1).

At 320, the second device 102(2) switches form a reception mode to a transmission mode so that it can begin sending audio signals in reply. For instance, the second device 102(2) can switch from a reception mode to a transmission mode by turning on or activating a transmitter of the second device 102(2) and/or optionally turning off or deactivating a receiver of the second device 102(2). When the second device 102(2) receives the initial communication from the first device 102(1), the second device 102(2) can receive the sound currently in the environment before the second user starts talking in reply. That is, the second device 102(2) receives at its microphone(s) a first sound of the environment that might include any number of interfering sounds 116, like running water, appliances, programming content, etc. In this way, the second device 102(2) has an audio profile of the environment prior to the user speaking. The second device 102(2) can process a signal representation of the sound prior to user speech for use in later understanding when the user begins and subsequently ends speaking.

At 322, the second device 102(2) receives sound from the environment and generates an audio signal 110(2), where at least a portion of the audio signal 110(2) includes both user speech 108(2) and interfering sound 116. For instance, a microphone of the second device 102(2) can receive both the user speech 108(2) from the second user 106(2) and the interfering sound 116. As such, the second audio signal 110(2) includes both audio components of the user speech 108(2) and the interfering sound 116.

At 324, the second device 102(2) sends, using the second transmitter, the audio signal 110(2) to the first device 102(1) through the communication channel. For instance, the second device 102(2) can utilize a transmitter of the second device 102(2) to send the audio signal 110(2) to the first device 102(1) through the communication channel since the second device 102(2) is in a transmission mode.

At 326, the first device 102(1) receives the audio signal 110(2) from the second device 102(2) through the communication channel and outputs the audio signal 110(2) from a speaker as audio speaker output 112(2). For instance, the first device 102(1) can receive the audio signal 110(2) from the second device 102(2) using a receiver of the first device 102(1) since the first device 102(1) is in a reception mode. The first device 102(1) can then process the audio signal 1102(2) to retrieve the user speech 108(2) spoken by the second user 108(2) and audibly emit the user speech 108(2) as audio speaker output 112(2) so that the first user 106(1) can hear the second user's reply.

At 328, the second device 102(2) analyzes the audio signal 110(2) to determine whether the audio signal 110(2) lacks the user speech 108(2). The second device 102(2) can use the audio profile taken before the user began speaking (i.e., act 320) to help isolate the user speech. In some examples, determining whether the audio signal 110(2) lacks the user speech 108(2) includes determining whether the audio signal 110(2) lacks the user speech 108(2) for a threshold period of time. For instance, the second device 102(2) can analyze the audio signal 110(2) to determine that the user speech 108(2) ended at time T(3), by virtue of monitoring and analyzing the audio signal 110(2) for a threshold period of time beyond time T(3) to time T(4). The second device 102(2) can perform speech recognition and noise cancellation on the audio signal 110(2) to determine when the audio signal 110(2) lacks the user speech 108(2), which is discussed below with regard to FIGS. 4-6.

At 330, the second device 102(2) can cause the transmitter to deactivate and stop sending the audio signal 110(2) to the first device 102(1). For instance, the second device 102(2) can switch from a transmission mode to a reception mode by turning off or deactivating the transmitter of the second device 102(2) and turning on or activating a receiver of the second device 102(2).

At 332, the first device 102(1) activates the first transmitter and starts sending audio signals. For instance, the first device 102(1) can switch from a reception mode to a transmission mode by turning on or activating a transmitter of the first device 102(1) and/or optionally turning off or deactivating a receiver of the first device 102(1).

At 334, the first device 102(1) and the second device 102(2) may optionally keep sending and receiving audio signals back and forth to each other using the steps described above through the communication channel. For instance, each device can continue to switch to a transmission mode, send an audio signal, analyze the audio signal, switch to a reception mode, receive an audio signal, and then switch back to the transmission mode. In some examples, the first device 102(1) and the second device 102(2) can continue these steps until the first user 106(1) and the second user 106(2) stop communicating with one another altogether.

At 336, the first device 102(1) determines whether to close the communication channel. For instance, the first device 102(1) determines to close the conversation when the first device 102(1) determines that the conversation between the first user 106(1) and the second user 106(2) is complete. In some examples, the first device 102(1) determines the conversation is complete when the first device 102(1) receives (either through the microphone or from the second device 102(2)) audio signals that no longer include user speech from the first user 106(1) and/or the second user 106(2). In other examples, the first device 102(1) determines the conversation is complete when the first device 102(1) receives an audio signal from the third device 102(3) that includes user speech from the second user 106(2), which is discussed below with regard to FIG. 8.

At 338, the first device 102(1) closes the communication channel between the first device 102(1) and the second device 102(2). There are a few ways to detect when a conversation is complete. One approach is to fail to detect any additional speech input for a prescribed period of time (e.g., 10 seconds or longer). Another approach is to receive another trigger word that signals a desire to end the communication (e.g., "goodbye"). Yet another approach is to detect when the user moves from one device to another, thereby causing one channel to be closed and another one to open. This last approach is described in more detail in FIG. 8.

The first device 102(1) can close the communication channel in various ways. For instance, the first device 102(1) may temporarily pause any form of transmission/reception with the second device 102(2). As an alternative, the first device 102(1) can switch to a reception mode while the second device 102(2) remains the in the reception mode. In this way, the devices 102(1)-(2) are each ready to capture the next speech input from the user 106(1)-(2) via the microphone or to receive communications from another device to begin a new conversation.

Figure 4:
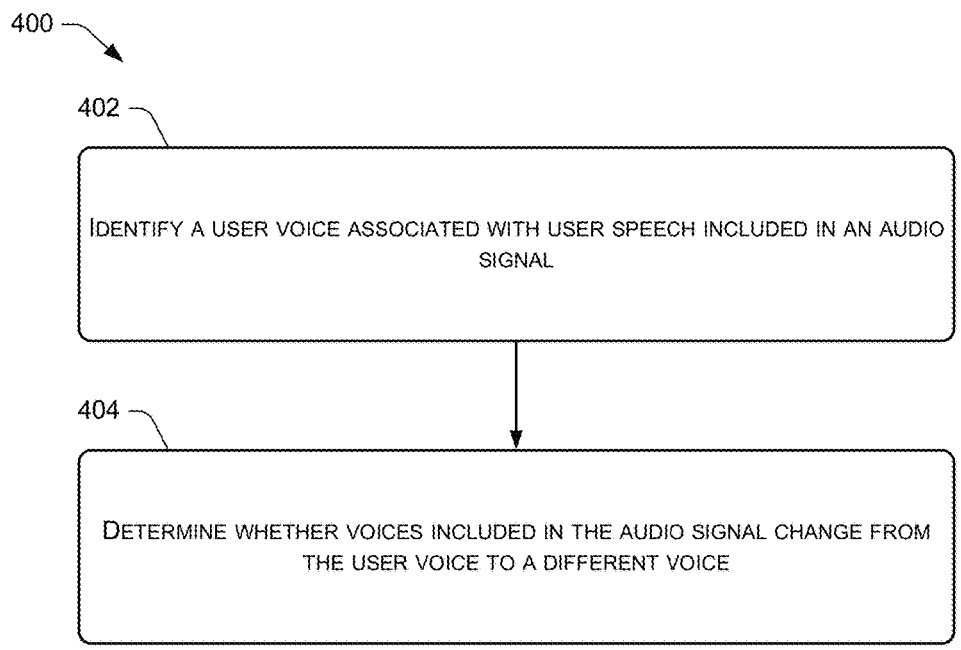
FIG. 4 is a flow diagram illustrating an example process for determining when an audio signal lacks user speech based on a voice associated with the user speech.
Figure 5:
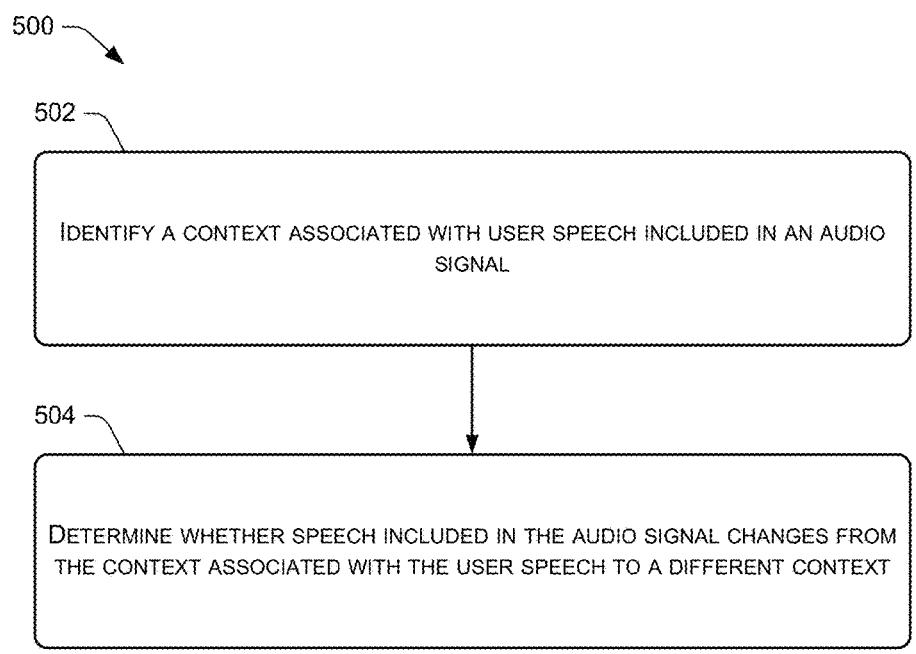
FIG. 5 is a flow diagram illustrating an example process for determining when an audio signal lacks user speech based on a context associated with the user speech.
Figure 6:
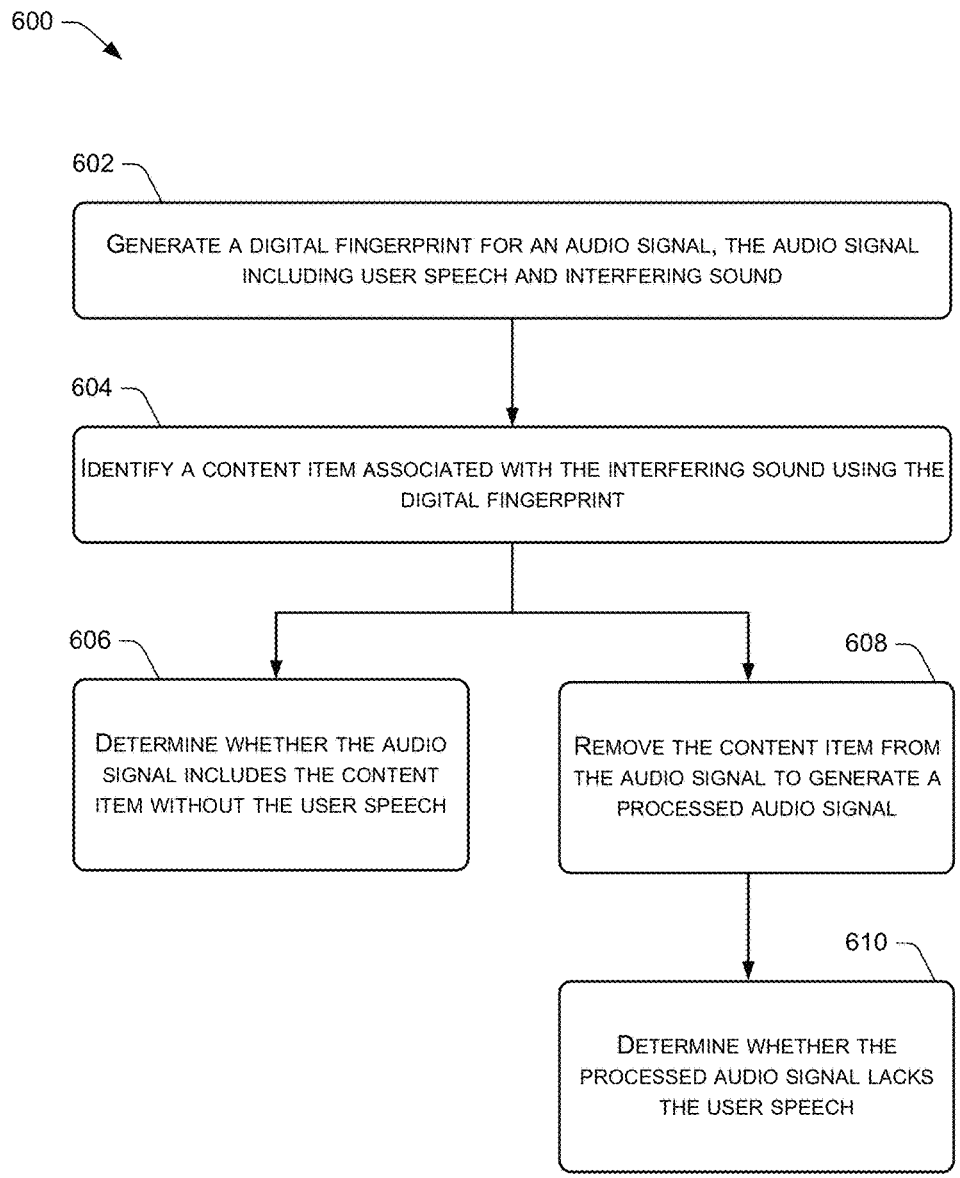
FIG. 6 is a flow diagram illustrating an example process for determining when an audio signal lacks user speech based on identifying a content item included in the audio signal.

FIGS. 4-6 provide different example processes for determining when the user stops speaking in open microphone communication, even though other interfering noise may continue to include some form of human verbal communication. For instance, and as was discussed in step 324 of FIGS. 3A-3D, the second device 102(2) can perform speech recognition and noise cancellation on the audio signal 110(2) that includes the interfering sound 116 to determine when the audio signal 110(2) lacks the user speech 108(2).

In FIG. 4, an example process 400 makes the determination of when the audio signal 110(2) lacks the user speech 108(2) based on the particular voice associated with the user speech 108(2). The process 400 can be used since an audio signal 110(2) includes both user speech 108(2) and interfering sounds 116. The process 400 will be discussed using the example environment 100 of FIG. 1B.

At 402, the second device 102(2) can identify a user voice associated with user speech 108(2) included in an audio signal 110(2). For instance, the second device 102(2) can utilize speech recognition to analyze the audio signal 110(2) to parse through the user speech 108(2) and convert it to a form that can be processed and interpreted. The second device 102(2) can then use the processed user speech 108(2) to identify the user speech 108(2) as belonging to the second user 106(2).

At 404, the second device 102(2) determines whether voices included in the audio signal 110(2) change from the second user's 106(2) voice to a different voice. For instance, the second device 102(2) can determine that speech included in the audio signal 110(2) changes from the second user's speech 108(2) to an additional human's speech based on determining that the voice included in the audio signal 110(2) changes from the second user's 106(2) voice to an additional human's voice. The additional human's speech can be included in the interfering sound 116. For example, the additional human's speech can be output from a content item playing on media player 114 and/or from an additional human (not shown) that is at location 104(2) and in the presence of the second device 102(2).

FIG. 5 shows another example process 500 for determining when the audio signal 110(2) lacks the user speech 108(2), but this determination is based on a context associated with the user speech 108(2). The process 500 is premised on the situation where the interfering sounds 116 include other forms of human speech that are not from the second user 106(2) in the conversation. The process 500 will be discussed using the example environment 100 of FIG. 1B.

At 502, the second device 102(2) identifies a context associated with the user speech 108(2) included in an audio signal 110(2). For instance, the second device 102(2) utilizes speech recognition to analyze the audio signal 110(2) and develops a context associated with the user speech 108(2) included in the audio signal 110(2). For instance, the user speech 108(2) may include identifiable phrases as "making for dinner" or "baking potatoes" to understand that the context pertains to eating dinner.

At 504, the second device 102(2) determines whether speech included in the audio signal 110(2) changes from the context identified as being associated with the user speech 108(2) to a different context. The second device 102(2) may detect, for example, that the speech abruptly changes from phrases about dinner (e.g., "making for dinner") to phrases about an entirely unrelated topic. For instance, suppose a television program playing in the background is broadcasting a swimming event, and the announcers are talking about the lap speeds in a particular race. The second device 102(2) can parse the language in the audio signal and identify phrases like "the lap time was under record pace" or "swimming the backstroke". The second device 102(2) may compare these words and phrases in an ontology or some other corpus and understand that they are entirely unrelated contexts. Based on this, the device 102(2) determines that a context associated with the speech changes from the context associated with user speech 108(2) of the second user 106(2) to a different context, meaning that the second user has stopped speaking.

FIG. 6 shows yet another example process 600 for determining when an audio signal 110(2) lacks user speech 108(2), but in this case the process attempts to rule out user speech by identifying other sources for the speech. In this example, the second device 102(2) identifies a content item included in the audio signal 110(2) that may sound like the user speech, but can be attributable to other interfering sounds, like programming output form a media player. The process 600 will be discussed using the example environment 100 of FIG. 1B.

At 602, the second device 102(2) generates a digital fingerprint for an audio signal 110(2), where the audio signal 110(2) includes both user speech 108(2) and interfering sound 116. For instance, the second device 102(2) can generate the digital fingerprint for the audio signal 110(2) by taking a sample of the audio signal 110(2). The digital fingerprint uniquely represents all or various components within the audio signal 110(2).

At 604, the second device 102(2) uses the digital fingerprint to identify a content item associated with interfering sound 116. For instance, the second device 102(2) can compare the digital fingerprint to other fingerprints from known programming content that may be the cause or source of the interfering sound 116. The other fingerprints may cover all or portions of the known programming content. In comparing the digital fingerprint to the known programming content, the second device 102(2) can identify a match for the digital fingerprint. When a match occurs, the second device 102(2) determines that a content item playing on a media player 114 is the interfering sound 116.

In some examples, at 606, the second device 102(2) can then determine whether the audio signal 110(2) lacks the user speech 108(2) by determining when the audio signal 110(2) includes the identified content item without the user speech 108(2). For instance, the second device 102(2) can determine when the speech included in the audio signal 110(2) is from the identified content item (interfering sound 116) and thus, not the user speech 108(2).

In other examples, at 608, the second device 102(2) can determine whether the audio signal 110(2) lacks the user speech 108(2) by first removing the interfering sound 116 output from the identified content item from the audio signal 110(2) to generate a processed audio signal. At 610, the second device 102(2) can then determine whether the processed audio signal lacks the user speech 108(2).

It should be noted that the process 600 can be used for interfering sound other than content items playing on a media player. For instance, the process 600 can be used for known forms of sound produced in an environment, such as appliances, running water, weather, animals, or the like. For example, the second device 102(2) may generate a digital fingerprint for an audio signal that includes interfering sound that consists of running water. The second device 102(2) can then compare the digital fingerprint to a database of content items, where the database includes one or more content items corresponding to the sound of running water, to identify the interfering sound as running water. Next, the second device 102(2) can determine when the audio signal lacks the user speech by determining when the audio signal includes the identified sound of running water without user speech and/or the second device 102(2) can remove the identified sound of running water from the audio signal and then determine when the audio signal lacks the user speech.

Figure 7:
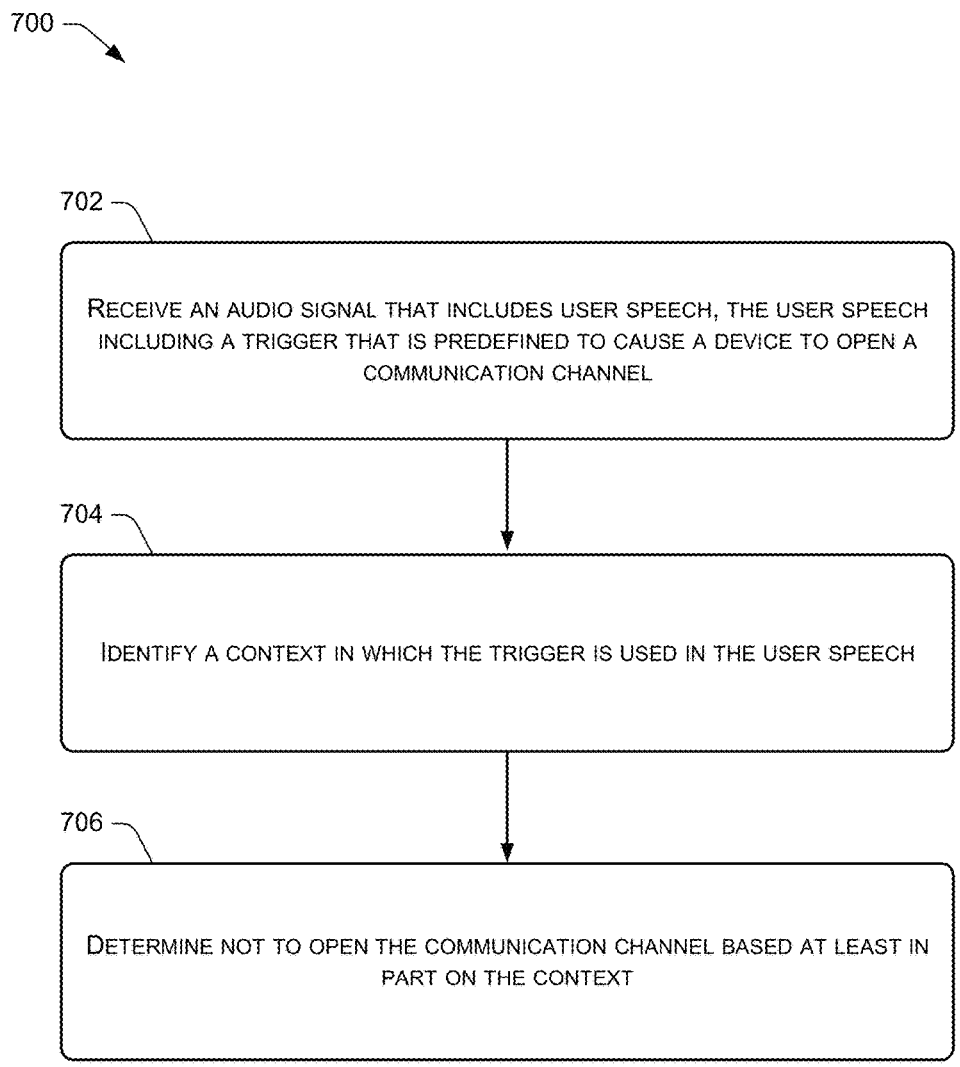
FIG. 7 is a flow diagram illustrating an example process for determining whether or not a trigger is valid.

FIG. 7 illustrates an example process 700 for determining whether or not a trigger is valid. For instance, and as was discussed in step 302 of FIGS. 3A-3D, the first device 102(1) may analyze the trigger to determine whether the trigger is valid before opening the communication channel with the second device 102(2). The process 700 will be discussed using the example environment 100 of FIG. 1A.

At 702, the first device 102(1) can receive an audio signal 110(1) that includes user speech 108(1) that contains a trigger. The trigger is predefined audio that, when detected, is intended to cause the first device 102(1) to open a communication channel with a second device 102(2). At 704, the first device 102(1) can identify a context in which the trigger is used in the user speech 108(1). For instance, the first device 102(1) can utilize speech recognition to analyze the user speech 108(1) to determine the context in which the trigger was used in user speech 108(1).

At 706, the first device 102(1) can determine not to open the communication channel based at least in part on the context. For instance, the first device 102(1) can determine that the first user 106(1) did not want to open the communication channel with the second device 102(2) based on the context associated with the user speech 108(1). For example, the first device 102(1) may determine that the first user 106(1) is actually talking to another human (not shown) that is also present at location 104(1) rather than the first device 102(1) based on the context associated with the user speech 108(1).

It should be noted that alternatively, in some examples, the first device 102(1) can determine not to open the communication channel based on a determination that the trigger is included in user speech from interfering sound (not shown in FIG. 1A). For instance, the first device 102(1) may determine not to open the communication channel with the second device 102(2) based on a determination that the trigger is from a content item (i.e., interfering sound) and not from the first user 106(1).

Figure 8:
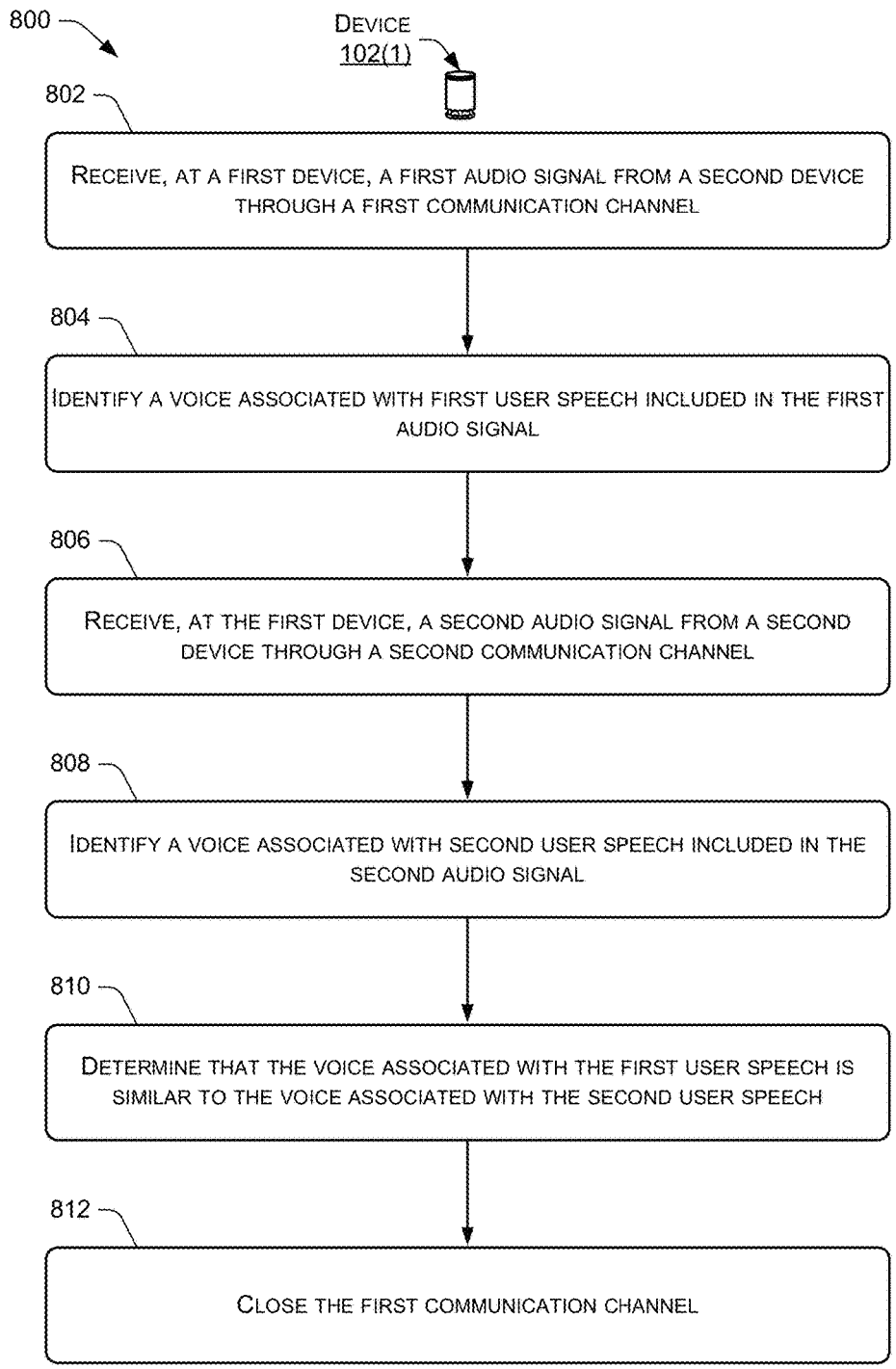
FIG. 8 is a flow diagram illustrating an example process for determining when to close a communication channel with a first device based on receiving an audio signal from a second device.

FIG. 8 illustrates an example process 800 for determining when to close a communication channel following completion of a conversation. As discussed in step 334 of FIGS. 3A-3D, the first device 102(1) can determine the conversation is complete with the second device 102(2) in several ways. Process 800 is directed to an approach where the first device 102(1) receives an audio signal from a third device 102(3), rather than the second device 102(2) that includes user speech from the second user 106(2), thereby indicating that the second user 106(2) has moved from one device to another. The process 800 will be discussed using the example environment 100 of FIGS. 1A-1C as if being performed by the first device 102. In this example, the user moves from talking to the second device 102(2) to speaking through the third device 102(3).

At 802, the first device 102(1) receives an audio signal 110(2) from a second device 102(2) through a first communication channel. At 804, the first device 102(1) identifies a voice associated with user speech 108(2) included in the audio signal 110(2). For instance, the first device 102(1) can utilize speech recognition to analyze the audio signal 110(2) to parse through the user speech 108(2) and convert it to a form that can be processed and interpreted. The first device 102(1) can then use the processed user speech 108(2) to identify a voice associated with the user speech 108(2) and/or the second user 106(2).

At 806, the first device 102(1) receives a second audio signal from a third device 102(3) through a second communication channel. At 808, the first device 102(1) identifies the voice associated with second user speech included in the second audio signal. For instance, the first device 102(1) can once again utilize speech recognition to analyze the second audio signal to parse through the second user speech and convert it to a form that can be processed and interpreted. The first device 102(1) can then use the processed second user speech to identify a voice associated with the second user speech and/or the second user 106(2).

At 810, the first device 102(1) determines that the voice associated with the user speech 108(2) is similar to the voice associated with the second user speech from the second audio signal. In some examples, the first device 102(1) can further determine that the second user 106(2) sent both the first audio signal from the second device 102(2) and the second audio signal from the third device 102(3) based on the voice associated with user speech 108(2) and the voice associated with the second user speech from the second audio signal.

At 812, the first device 102(1) can close the first communication channel with the second device 102(2). For instance, the first device 102(1) can determine that the second user 106(2) is now at location 104(3) using the third device 102(3) to communicate with the first user 106(1). In response, the first device 102(1) can close the first communication channel with the second device 102(2).

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   one or more processors; and
   one or more computer-readable media storing instructions that, when executed by the one or more processors, cause the one or more processors to perform operations comprising:
   receiving an audio signal that represents at least user speech and background noise;
   identifying the background noise represented by the audio signal;
   processing at least a portion of the audio signal including the background noise to generate a processed audio signal with less of the background noise;
   determining that the processed audio signal represents the user speech during a first period of time;

sending data based at least in part on the processed audio signal associated with the first period of time;

determining that the processed audio signal ceases to represent the user speech during a second period of time; and ceasing sending the data during at least a portion of the second period of time.

2. The system as recited in claim 1, wherein determining that the processed audio signal ceases to represent the user speech comprises determining, during the second period of time, that the processed audio signal ceases to represent the user speech for a threshold period of time.

3. The system as recited in claim 1, the operations further comprising:

analyzing the processed audio signal to identify a first voice identity associated with the user speech and a second voice identity associated with additional user speech included in the background noise, wherein determining that the processed audio signal ceases to represent the user speech comprises determining that the processed audio signal changes from representing at least the first voice identity to representing the second voice identity during the second period of time.

4. The system as recited in claim 1, the operations further comprising:

analyzing the processed audio signal to identify at least a first context associated with the user speech and a second context associated with additional user speech included in the background noise, wherein determining that the processed audio signal ceases to represent the user speech comprises determining that the processed audio signal changes from representing at least the first context to representing the second context during the second period of time.

5. The system as recited in claim 1, the operations further comprising:

generating a digital fingerprint using the audio signal;

identifying, using the digital fingerprint, a content item that is associated with at least part of the background noise; and generating the processed audio signal by at least canceling sound associated with the content item from the audio signal.

6. The system as recited in claim 1, wherein the audio signal comprises a first audio signal and the user speech comprises first user speech, and wherein the operations further comprise:

receiving a second audio signal that represents at least second user speech;

determining that the second audio signal ceases to represent the second user speech; and ceasing sending the second audio signal.

7. The device as recited in claim 1, wherein the processing at least the portion of the audio signal comprises reducing interfering sound in the audio signal and isolating human speech.

8. A method comprising:

receiving, by one or more computing devices, an audio signal from an electronic device;

determining, by the one or more computing devices, that the audio signal represents user speech and background noise during a first period of time;

processing at least a portion of the audio signal including the background noise to generate a processed audio signal with less of the background noise;

analyzing, by the one or more computing devices, the processed audio signal; and determining, by the one or more computing devices, that the processed audio signal ceases to represent the user speech during a second period of time.

9. The method as recited in claim 8, wherein determining that the audio signal ceases to represent the user speech comprises determining, during the second period of time, that the audio signal ceases to represent the user speech for a threshold period of time.

10. The method as recited in claim 8, further comprising:

identifying, based at least in part on analyzing the processed audio signal, a first voice identity associated with the user speech and a second voice identity associated with additional user speech, wherein determining that the processed audio signal ceases to represent the user speech comprises determining that the processed audio signal changes from representing at least the first voice identity to representing the second voice identity during the second period of time.

11. The method as recited in claim 8, further comprising:

identifying, based at least in part on analyzing the processed audio signal, a first context associated with the user speech and a second context associated with additional user speech, wherein determining that the processed audio signal ceases to represent the user speech comprises determining that the processed audio signal changes from representing at least the first context to representing the second context during the second period of time.

12. The method as recited in claim 8, further comprising:

generating, based at least in part on analyzing the audio signal, a digital fingerprint that represents at least a portion of the audio signal;

identifying, using the digital fingerprint, a content item associated with at least part of the background noise; and generating the processed audio signal by at least canceling sound associated with the content item from the audio signal.

13. The method as recited in claim 8, wherein the electronic device comprises a first electronic device, the audio signal comprises a first audio signal, and the user speech comprises first user speech, and wherein the method further comprises:

receiving a second audio signal from a second electronic device;

determining that the second audio signal represents at least second user speech;

analyzing the second audio signal;

determining that the second audio signal ceases to represent the second user speech; and sending, to at least one of the first electronic device or the second electronic device, data indicating that the second audio signal ceases to represent the second user speech.

14. The method as recited in claim 8, further comprising sending, to the electronic device, a message that causes the electronic device to cease from sending the processed audio signal.

15. The method as recited in claim 8, further comprising:

sending, to an additional electronic device, the processed audio signal during the first period of time; and based at least in part on determining that the processed audio signal ceases to represent the user speech, ceasing from sending, to the additional electronic device, the processed audio signal during at least a portion of the second period of time.

16. The method as recited in claim 8, wherein the background noise includes a triggering word that, when identified by the electronic device, causes the electronic device to send the audio signal to the one or more computing devices.

17. A method comprising:
receiving an audio signal representing user speech and background noise during a first period of time;
processing at least a portion of the audio signal with the background noise to generate a processed audio signal with less of the background noise;
sending first data based at least in part on the processed audio signal during the first period of time;
determining that the processed audio signal ceases to represent the user speech during a second period of time; and
ceasing sending second data based at least in part on the processed audio signal during at least a portion of the second period of time.

18. The method as recited in claim 17, further comprising:
analyzing the audio signal to identify (i) at least one of a first voice identity or a first context associated with additional user speech included in the background noise and (ii) at least one of a second voice identity or a second context associated with the user speech,
wherein determining that the processed audio signal ceases to represent the user speech comprises at least one of:
determining when the processed audio signal changes from representing at least the second voice identity to representing the first voice identity during the second period of time; or
determining when the processed audio signal changes from representing at least the second context to representing the first context during the second period of time.

19. The method as recited in claim 17, wherein the user speech comprises first user speech, and wherein the method further comprises:
receiving a first portion of a third audio signal that represents at least second user speech;
determining that the first portion of the third audio signal ceases to represent the second user speech; and
ceasing from processing a second portion of the third audio signal.

20. The method as recited in claim 17, further comprising transitioning, by the electronic device, from a transmission mode, during which the electronic device sends data, to a reception mode, during which the electronic device generates audio data based on captured sound.

* * * * *